(12) United States Patent
Zhao et al.

(10) Patent No.: US 10,142,424 B2
(45) Date of Patent: Nov. 27, 2018

(54) TWO-LEVEL CLOUD SYSTEM MIGRATION

(71) Applicant: Empire Technology Development LLC, Wilmington, DE (US)

(72) Inventors: Ran Zhao, Beijing (CN); Qi Li, Beijing (CN); Xuefeng Song, Hebei (CN)

(73) Assignee: Empire Technology Development LLC, Wilmington, DE (US)

( * ) Notice: Subject to any disclaimer, the term of this patent is extended or adjusted under 35 U.S.C. 154(b) by 480 days.

(21) Appl. No.: 14/408,560

(22) PCT Filed: Oct. 16, 2013

(86) PCT No.: PCT/CN2013/085273
§ 371 (c)(1),
(2) Date: Dec. 16, 2014

(87) PCT Pub. No.: WO2015/054832
PCT Pub. Date: Apr. 23, 2015

(65) Prior Publication Data
US 2016/0269488 A1 Sep. 15, 2016

(51) Int. Cl.
*G06F 15/16* (2006.01)
*H04L 29/08* (2006.01)
*G06F 17/30* (2006.01)
(52) U.S. Cl.
CPC ............ *H04L 67/141* (2013.01); *G06F 17/30* (2013.01); *H04L 67/10* (2013.01);
(Continued)

(58) Field of Classification Search
CPC .......... H04L 67/10; H04L 63/10; H04L 67/02; H04L 67/42; H04L 63/0428; H04L 63/08;
(Continued)

(56) References Cited

U.S. PATENT DOCUMENTS

| | | | |
|---|---|---|---|
| 6,405,294 B1 | 6/2002 | Hayter | |
| 2003/0182525 A1* | 9/2003 | O'Connell | G06F 17/30067 711/162 |

(Continued)

OTHER PUBLICATIONS

Racemi. "Cloud Migration Software," accessed at https://web.archive.org/web/20131010014944/http://www.racemi.com/, accessed on Oct. 10, 2014, pp. 1-3.

(Continued)

*Primary Examiner* — Tauqir Hussain
*Assistant Examiner* — Thao Duong

(57) ABSTRACT

Technologies are generally described for systems and methods effective to provide migration of data to a cloud computing service without interruption of service to client devices. In an example, a method includes establishing a first communication link with one or more communication devices and establishing a second communication link with a source device. The method also includes transferring via the second communication link at least a data set of a plurality of data sets of the source device and storing at least the data set to a data store. Further, the method includes receiving, via the first communication link, a request for the data set or another data set of the plurality of data sets, wherein the request is received from a communication device of the one or more communication devices.

20 Claims, 14 Drawing Sheets

(52) U.S. Cl.
CPC ...... *H04L 67/1014* (2013.01); *H04L 67/1097* (2013.01); *H04L 67/148* (2013.01)

(58) Field of Classification Search
CPC . H04L 63/102; H04L 63/0876; H04L 67/306; H04L 65/4084; H04L 67/12; H04L 67/16; G06F 21/6254; G06F 21/6218; G06F 2221/033; G06F 17/3053; G06F 17/30864; G06F 21/10
See application file for complete search history.

(56) References Cited

U.S. PATENT DOCUMENTS

| | | | |
|---|---|---|---|
| 2005/0138176 A1* | 6/2005 | Singh | G06F 17/30902 709/226 |
| 2006/0031594 A1* | 2/2006 | Kodama | G06F 11/2058 710/5 |
| 2007/0112974 A1* | 5/2007 | Shirogane | H04L 67/1097 709/239 |
| 2007/0233783 A1* | 10/2007 | Tanimoto | G06F 3/0485 709/203 |
| 2009/0007106 A1* | 1/2009 | Araujo, Jr. | G06F 9/54 718/1 |
| 2009/0154262 A1* | 6/2009 | Tokunaga | G11C 7/24 365/189.15 |
| 2009/0157866 A1* | 6/2009 | Sridharan | H04L 69/163 709/224 |
| 2011/0107327 A1 | 5/2011 | Barkie et al. | |
| 2011/0138384 A1 | 6/2011 | Bozek et al. | |
| 2012/0042033 A1 | 2/2012 | Ayala, Jr. et al. | |
| 2012/0054259 A1 | 3/2012 | Peng | |
| 2012/0054731 A1 | 3/2012 | Aravamudan et al. | |
| 2012/0102084 A1 | 4/2012 | Hiltunen et al. | |
| 2012/0137098 A1 | 5/2012 | Wang et al. | |
| 2012/0137287 A1 | 5/2012 | Pang et al. | |
| 2012/0167081 A1 | 6/2012 | Sedayao et al. | |
| 2012/0226804 A1* | 9/2012 | Raja | H04L 43/028 709/224 |
| 2012/0297016 A1 | 11/2012 | Iyer et al. | |
| 2014/0196037 A1* | 7/2014 | Gopalan | G06F 9/4856 718/1 |
| 2014/0282976 A1* | 9/2014 | Holmelin | H04L 63/08 726/7 |

OTHER PUBLICATIONS

Hollingsworth, Paul. "SOA World Special: What Makes One Data Migration Work Where Another Fails?," SYS-CON Media Inc., accessed at http://soa.sys-con.com/node/490841/print, accessed on Oct. 24, 2014, pp. 1-3.

International search report and written opinion for PCT application No. PCT/CN2013/085273 dated Jul. 16, 2014, 13 pages.

Racemi. "Industry's First 3-Way Cloud-to-Cloud Migration—Racemi breaks cloud lock-in without modifying server workloads" May 2, 2011, published online at [http://www.racemi.com/azrstm/], 2 pages.

* cited by examiner

TWO-LEVEL CLOUD SYSTEM MIGRATION

CROSS-REFERENCE TO RELATED APPLICATION

This Application is a U.S. National Stage filing under 35 U.S.C. § 371 of International Application No. PCT/CN2013/085273, filed on Oct. 16, 2013, and entitled "TWO-LEVEL CLOUD SYSTEM MIGRATION." The disclosure of International Application No. PCT/CN2013/085273 is incorporated herein by reference in its entirety.

TECHNICAL FIELD

The subject disclosure relates generally to cloud system migration and, also generally, to two-level cloud system migration.

BACKGROUND

With advancements in computing technology and the prevalence of computing devices, usage of computers for daily activities has become commonplace. For example, people and/or enterprises might utilize cloud data services in a cloud-computing environment due to the costs associated with maintaining an on-premise computing system. Cloud computing can provide various computing capabilities (e.g., software, data access, storage services, and so forth) without a user (e.g., end-user or device) being aware of the physical location and/or configuration of the system(s) that delivers the services.

With popularization of cloud computing, migration of cloud computing systems has become a main application for the use of these services. In one example, data can be moved from an on-premise computer to the cloud computer. However, during the data migration process, the data is typically not accessible, which negatively impacts the user experience. Thus, the ability to migrate data to the cloud computing system and the impact on normal service has been blamed for user dissatisfaction.

The above-described deficiencies of conventional approaches to migration of data to cloud computing systems are merely intended to provide an overview of some of the problems of conventional approaches and techniques, and are not intended to be exhaustive. Other problems with conventional systems and techniques may become further apparent upon review of the following description.

SUMMARY

In one embodiment, a method includes facilitating, by a system comprising a processor, establishing a first communication link with one or more communication devices for replacement of a direct communication link between a source device and the one or more communication devices. The source device comprises a plurality of data sets. The method also includes facilitating establishing a second communication link with the source device. The method also includes transferring, via the second communication link, at least a data set of the plurality of data sets and storing at least the data set to a data store. Further, the method includes receiving, via the first communication link, a request for the data set or another data set of the plurality of data sets. The request is received from a communication device of the one or more communication devices.

In another embodiment, a system includes a memory storing computer-executable components and a processor, communicatively coupled to the memory, which executes or facilitates execution of one or more of the computer-executable components. The computer-executable components include a client processing manager configured to establish a communication session with a device and a background processing manager configured to establish a link with a host service. The host service is configured to process requests from the device. The computer-executable components also include a data relocator configured to migrate data from the host service to the memory via the link and a communicator configured to receive, via the communication session, a request from the device for a subset of the data. Further, the computer-executable components include a service request processor configured to obtain the subset of the data from the memory or from the host service. The communicator is further configured to send the subset of the data to the device in response to the request. The data relocator is further configured to migrate the data from the host service concurrently with the service request processor obtaining the subset of the data.

In an additional embodiment, a computer-readable storage device comprising computer-executable instructions that, in response to execution, cause a system comprising a processor to perform operations is provided. The operations include initiating establishment of a first communication link with at least one communication device to replace a direct communication link between a source device and the at least one communication device. The source device comprises a plurality of data segments. The operations also include initiating establishment of a second communication link with the source device and transferring, via the second communication link, at least a data segment of the plurality of data segments. Further, the operations include storing the data segment to a data store and receiving, via the first communication link, a request from the at least one communication device. The request is for the data segment or another data segment of the plurality of data segments.

In yet another embodiment, a system includes a memory to store instructions and a processor, coupled to the memory, that executes or facilitates execution of the instructions to perform operations. The operations include creating a first communication link with a communication apparatus and creating a second communication link with a host device. The first communication link and the second communication link replace a direct link between the communication apparatus and the host device. The operations also include transferring a plurality of data segments from the host device via the second communication link and storing the plurality of data segments transferred from the host device in a data store. Further, the operations include receiving from the communication apparatus a request for a data segment of the plurality of data segments and determining a location of the data segment. The operations also include accessing the data segment at the location and conveying a reply to the request via the first communication link, including conveying at least a portion of the data segment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are further described with reference to the accompanying drawings in which.

DETAILED DESCRIPTION

Overview

Figure 1:
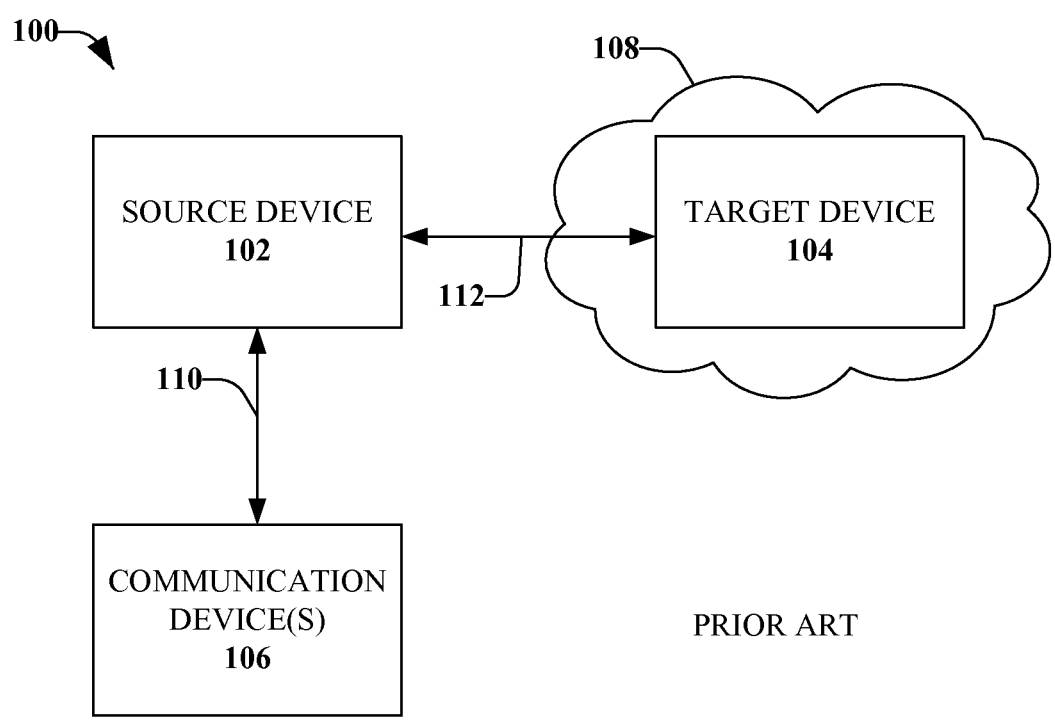
FIG. 1 illustrates a system for data migration from a source device to a target device according to an example conventional system.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

Various non-limiting embodiments directed to two-level data migration are described. As disclosed herein, data can be migrated to cloud computing systems without interrupting service. During the process of migration, source machines may function as background devices of target machines. Further, during the data migration process, the target machines may function as clients of the source machines. For example, the target machines may keep their services running during migration and, if requested, data may be obtained from the source machines to service the client request.

In consideration of the various issues with conventional data migration and their limitations, one or more embodiments described herein facilitate the migration of data from a source device to a target device, wherein the data migration is transparent to client devices of the source device. For example, as disclosed herein a cloud service can be replicated without shutdown and, thus, during the replication, the user will not notice the change of server. The disclosed aspects provide a one-time migration and copies data from the old system (e.g., source) to the new system (e.g., target). In such a manner, the disclosed aspects operate similar to a "do not migrate" process, however, there is no synchronization back to the old system with the aspects disclosed herein. Further, the disclosed aspects are configured to provide a single approach to a migration system in a relatively short time without interruption of service.

In one embodiment, a method is described herein that includes facilitating, by a system comprising a processor, establishing a first communication link with one or more communication devices for replacement of a direct communication link between a source device and the one or more communication devices. The source device comprises a plurality of data sets. The method also includes facilitating establishing a second communication link with the source device and transferring, via the second communication link, at least a data set of the plurality of data sets. The method also includes storing at least the data set to a data store and receiving, via the first communication link, a request for the data set or another data set of the plurality of data sets. The request is received from a communication device of the one or more communication devices.

According to an example, the method can also include using an identifier of the source device during a communication with the one or more communication devices and using one or more identifiers of the one or more communication devices during another communication with the source device.

In accordance with another example, the method can also include processing the request. Further to this example, processing the request can include accessing the data store for the data set and transmitting a reply to the request to the communication device. In some examples, the reply comprises at least a portion of the data set. Further, in some examples, the request is a read request for the data set.

In another example, the method can include processing the request. Further to this example, the method can include determining the other data set is not contained in the data store and simulating a functionality of the communication device. Further to this example, the method can include receiving the other data set from the source device via the second communication link and transferring, via the first communication link, at least a portion of the other data set to the communication device in response to the request. In this example, the request is a read request for the other data set.

The simulating, according to an example, includes using an identifier of the communication device during a communication with the source device and requesting the other data set from the source device. According to another example, the method includes storing the other data set in the data store.

In still another example, the method includes processing the request. Further to this example, the method includes accessing the data set from the data store and receiving the other data set from the source device. The method also includes sending respective portions of the data set and the other data set to the communication device in response to the request.

Facilitating the establishing of the first communication link comprises, according to an aspect, intercepting a communication from the communication device. The communication from the communication device is identified based on an identifier associated with the source device.

In still another example, the method also includes monitoring write data received from the communication device and storing the write data in the data store. The method also includes distinguishing the write data from the data set and the other data set. Further to this example, the distinguishing comprises marking the write data as new data.

According to another example, the method includes determining the plurality of data sets have been migrated from the source device and terminating the second communication link. In another example, the method includes processing the request, which can comprise initiating replication of a network service that is transparent to the communication device.

Facilitating the establishing of the second communication link comprises, according to an example, facilitating establishing a client relationship with the source device that performs a background operation during a transfer of data sets from the source device. According to another example, facilitating the establishing of the second communication link comprises communicating with the source device via one or more intermediate network devices.

In another embodiment, a system, described herein, includes a memory storing computer-executable components and a processor, communicatively coupled to the memory, which executes or facilitates execution of one or more of the computer-executable components. The computer-executable components include a client processing manager configured to establish a communication session with a device. Also included is a background processing manager configured to establish a link with a host service. The host service is configured to process requests from the device. The computer-executable components also include a data relocator configured to migrate data from the host service to the memory via the link. Further to this example, the computer-executable components include a communicator configured to receive, via the communication session, a request from the device for a subset of the data and a service request processor configured to obtain the subset of the data from the memory or from the host service. The communicator is further configured to send the subset of the data to the device in response to the request. In addition, the data relocator is further configured to migrate the data from the host service concurrently with the service request processor obtaining the subset of the data.

The data relocator, according to an example, is further configured to determine the data from the host service has been migrated to the memory and the background processing manager is further configured to disable the link with the host service.

The background processing manager, according to another example, is further configured to establish the link with the host service via an intermediate device. Further to this example, the intermediate device is a communication network device.

According to another example, the request is a read request and the service request processor is configured to search the memory for the subset of the data and mirror a functionality of the device to access the host service for data not found in the memory. Further to this example, the communicator is further configured to send the data accessed from the host service to the device.

In another example, the client processing manager is further configured to intercept communications from the device. Further to this example, the communications comprise an address associated with the host service.

In still another example, the request comprises a write data segment stored in the memory. Further to this example, the computer-executable components include an overlay protector configured to identify the write data segment as non-rewritable data.

In another example, the link with the host service is a client relationship with the host service. Further to this example, the host service is configured to perform background operations concurrently with migration of the data by the data relocator from the host service to the memory via the link.

According to yet another example, the service request processor is further configured to replicate a network service that is transparent to the device.

In an additional embodiment, a computer-readable storage device that comprises computer-executable instructions that, in response to execution, cause a system comprising a processor to perform operations is provided. The operations include initiating establishment of a first communication link with at least one communication device to replace a direct communication link between a source device and the at least one communication device, wherein the source device comprises a plurality of data segments. The operations also include initiating establishment of a second communication link with the source device and transferring, via the second communication link, at least a data segment of the plurality of data segments. Further, to this example, the operations also include storing at least the data segment to a data store and receiving, via the first communication link, a request from the at least one communication device. According to this example, the request is for the data segment or another data segment of the plurality of data segments.

According to an example, the operations also include using an identifier of the source device during a communication with the at least one communication device and using at least one identifier of the at least one communication device during a communication with the source device.

In an example, the request is a read request and the operations further include accessing the data store for the data segment and determining the other data segment is not contained in the data store. The operations also include simulating a functionality of the at least one communication device and obtaining the other data segment from the source device via the second communication link. Further, the operations include transferring, via the first communication link, respective portions of the data segment and the other data segment to the at least one communication device in response to the read request.

In an example, the operations further include intercepting at least one communication from the at least one communication device. Further to this example, the at least one communication comprises an identifier associated with the source device.

In another example, the operations also include monitoring write data received from the at least one communication device and storing the write data to the data store. In addition, the operations can include distinguishing the write data from the data segment and the other data segment.

According to another example, the operations include determining that the plurality of data segments has been migrated from the source device. Further to this example, the operations also include terminating the second communication link.

In another embodiment provided herein is a system that includes a memory to store instructions and a processor, coupled to the memory, that executes or facilitates execution of the instruction to perform operations. The operations include creating a first communication link with a communication apparatus and creating a second communication link with a host device. The first communication link and the second communication link replace a direct link between the communication apparatus and the host device. The operations also include transferring a plurality of data segments from the host device via the second communication link and storing the plurality of data segments transferred from the host device in a data store. The operations also include receiving, from the communication apparatus, a request for a data segment of the plurality of data segments and determining a location of the data segment. In addition, the operations include accessing the data segment at the location and conveying a reply to the request via the first communication link, comprising conveying at least a portion of the data segment.

In an example, the operations can also include using an identification of the host device to communicate with the communication apparatus. Further to this example, the operations also include using an identifier of the communication apparatus to communicate with the host device.

The location of the data segment, according to an example, is based on a location of the data store. Further to this example, the operations include retrieving the data segment from the data store. Conveying the reply comprises sending the data segment to the communication apparatus.

According to another example, the location of the data segment is based on a location of the host device. Further to this example, the operations include obtaining the data segment from the host device via the second communication link. Further, providing the reply comprises sending the data segment to the communication apparatus via the first communication link.

In yet another example, the operations include monitoring write data received from the communication apparatus. In this example, the data store retains the write data. The operations also include distinguishing the write data from other data in the data store.

In still another example, the operations include determining the plurality of data segments has been transferred from the host device and disabling the second communication link.

Herein, an overview of some of the embodiments for providing a two-level cloud system migration has been presented above. As a roadmap for what follows next, various example, non-limiting embodiments and features for an implementation of cloud system migration are described in more detail. Then, a non-limiting implementation is given for a computing environment in which such embodiments and/or features can be implemented.

Two-Level Cloud System Migration

As mentioned above, in various embodiments, implementation of migration of data to an offsite storage device is disclosed. In some aspects, the migration of data can be executed without taking the source device off-line. Thus, according to some aspects, clients of the source devices can be unaware of the migration of the data to the offsite storage device. Further, according to some aspects, the migration of the data is performed without interruption of service to the clients.

FIG. 1 illustrates a system 100 for data migration from a source device 102 to a target device 104 according to an example conventional system. The source device is the device from which data is to be transferred and the target device is the device to which the data is transferred. For example, an enterprise (e.g., a business, an organization, a networked environment, and so on) can utilize the source device 102 that retains data, applications, and services used by one or more communication devices 106. In an example, the source device 102 can be a computer, a server, a data storage device, and so forth, that is configured to service data requests (e.g., read requests, write requests) from one or more communication devices 106. The communication devices 106 can be user devices associated with and/or authorized to use the services of the enterprise. For example, the communication devices 106 can be computers or other devices (e.g., user equipment) configured to use and/or to be acted upon by the data, applications, and/or services maintained by the source device 102. The communication devices 106 can be devices that communicate with the source device 102 through a wired connection or a wireless connection, including over the Internet, such as through a virtual private network, for example.

The target device 104 can be an offsite device, such as a device that is included in, or associated with, an external computing environment. For example, the target device 104 can be maintained by a commercial data source that is configured to provide various services and/or applications by application of a cloud computing environment. Thus, the target device 104 can be controlled and maintained by a third party, wherein the data is maintained and provided in a secured configuration. As illustrated, the target device 104 can be included, at least partially in a cloud computing environment 108.

Although discussed herein with respect to a single source device (e.g., the source device 102) and a single target device (e.g., the target device 104), it is noted that the disclosed aspects can utilize more than one source device and/or more than one target device. For example, an enterprise can utilize more than one source device to operate and maintain data and, further, data from the two or more source devices can be accessed separately, or in conjunction, by the one or more communication devices. In another example, a third party can use more than one target device to maintain the data for the enterprise. For example, two or more target devices can be utilized for scaling and/or efficiency purposes (e.g., faster retrieval, a back-up source, and so on).

In a general operation, as data is requested by users of the communication devices 106, the data can be retrieved from the source device 102 over a link 110 established between the communication devices 106 and the source device 102. Thus, the communication devices 106 and the source device 102 exchange information over the link 110.

When a decision is made to transfer data from the source device 102 to the target device 104, a link 112 is established between the source device 102 and the target device 104. For example, an operator (e.g., information technology personnel or someone with the proper authority) of the enterprise can contract with a third party entity, wherein the third party entity provides the cloud computing services. At about the same time as it is determined that information is to be transferred from the source device 102 to the target device 104, information related to the source device (or a set of source devices) may be received. Such information can include an Internet protocol (IP) address or other identifying information of the source device(s). The identifying information of the source device(s) can be utilized to identify which device the information is being migrated from and/or to identify the data. The information might also include information related to the communication devices 106.

While data is being migrated from the source device(s), a connection (e.g., the link 110) between the source device(s) and the communication device(s) is disabled. For example, during the time it takes to transfer the data from the source device(s) to the target device(s), the communication devices are not able to read and/or write content from/to the source device. This is because the source device is transferring the data and cannot process requests from the communication devices while the data is being transferred. The downtime caused by this interruption of services can lead to user frustration because the data is not accessible during the data transfer. The downtime can also result in monetary losses since the data is not available.

After all data has been transferred from the source device(s), the source device(s) can be taken offline and the communication devices interact directly with the target devices (e.g., through the cloud). For example, the communication devices can be provided the identification information of the target device(s) and can use the identification information to route (or reroute) the request to read and/or write data to the target device. Thus, the communication devices 106 are aware of the data migration (e.g., interruption of services) and have to notice and acknowledge the change of server (e.g., reroute request from the source device to the target device).

As discussed, the communication device(s) 106 are an active participant in the system 100 of FIG. 1. Further, data flow for the communication devices is interrupted because the source device(s) are taken off-line during the data migration.

Figure 2:
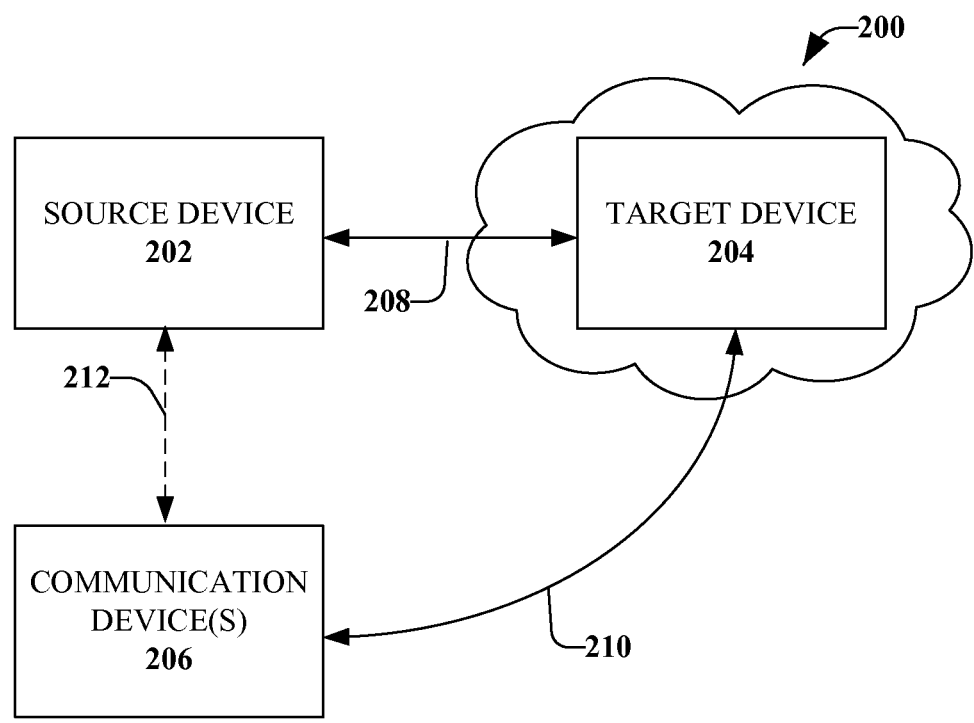
FIG. 2 illustrates an example, non-limiting embodiment of a system for migrating data from a source device to a target device with non-interruption of services.

FIG. 2 illustrates an example, non-limiting embodiment of a system 200 for migrating data from a source device 202 to a target device 204 with non-interruption of services. For example, the data migration may be undetectable by a communication device(s) 206 such that the communication device(s) 206 does not need to be aware that a data migration process is occurring (e.g., non-interruption of services) and/or has occurred (not aware that the identification of the server has changed).

In this embodiment, at about the same time as a link 208 is established between the source device 202 and the target device 204, another link 210 may be established between the target device 204 and the communication device(s) 206. During the data migration process, the target device 204 may use the identification of the source device 202 to interact with the communication device(s) 206. In a similar manner, the target device 204 may utilize an identification of a communication device to communicate with the source device 202. The identification used to communicate with the source device 202 may be based on which communication device requested data and where the data is located (e.g., non-migrated data is located at the source device and migrated data is located at the target device). A link(s) 212 between the source device 102 and the communication device(s) 106 may be disabled, or torn down at about the same time as data migration is initiated. However, the communication device(s) 206 are not aware that the communication is now with the target device 204.

For example, the communication device(s) 206 may send a request to read a set of data, wherein the request may be sent to an address associated with the source device 202. The request may be intercepted by the target device 204 and the target device 204 may determine whether the requested set of data has already been transferred from the source device 202. If so, the data may be sent from the target device 204 to the communication device(s) 206 in response to the request. If the data has not yet been migrated from the source device 202, the target device 204 may use an identification of the communication device(s) 206 to request the data from the source device 202. At about the same time as the data is received from the source device 202 in response to the request, the target device 204 may send the data to the communication device(s) 206 (using the identification of the source device 202). The target device 204 may also store the data in a data store associated with the target device 204 (e.g., stored as data migrated from the source device).

In another example, the communication device(s) 206 may send a write request to the source device 202, which may be intercepted by the target device 204. For example, the target device may have assumed the identity of the source device (e.g., might be using the identification or routing information of the source device). Therefore, the request may be sent directly to the target device without the communication device(s) being aware of the change. If the data does not exist on the target device, the data may be written into the target device (e.g., a data store) directly.

Figure 3:
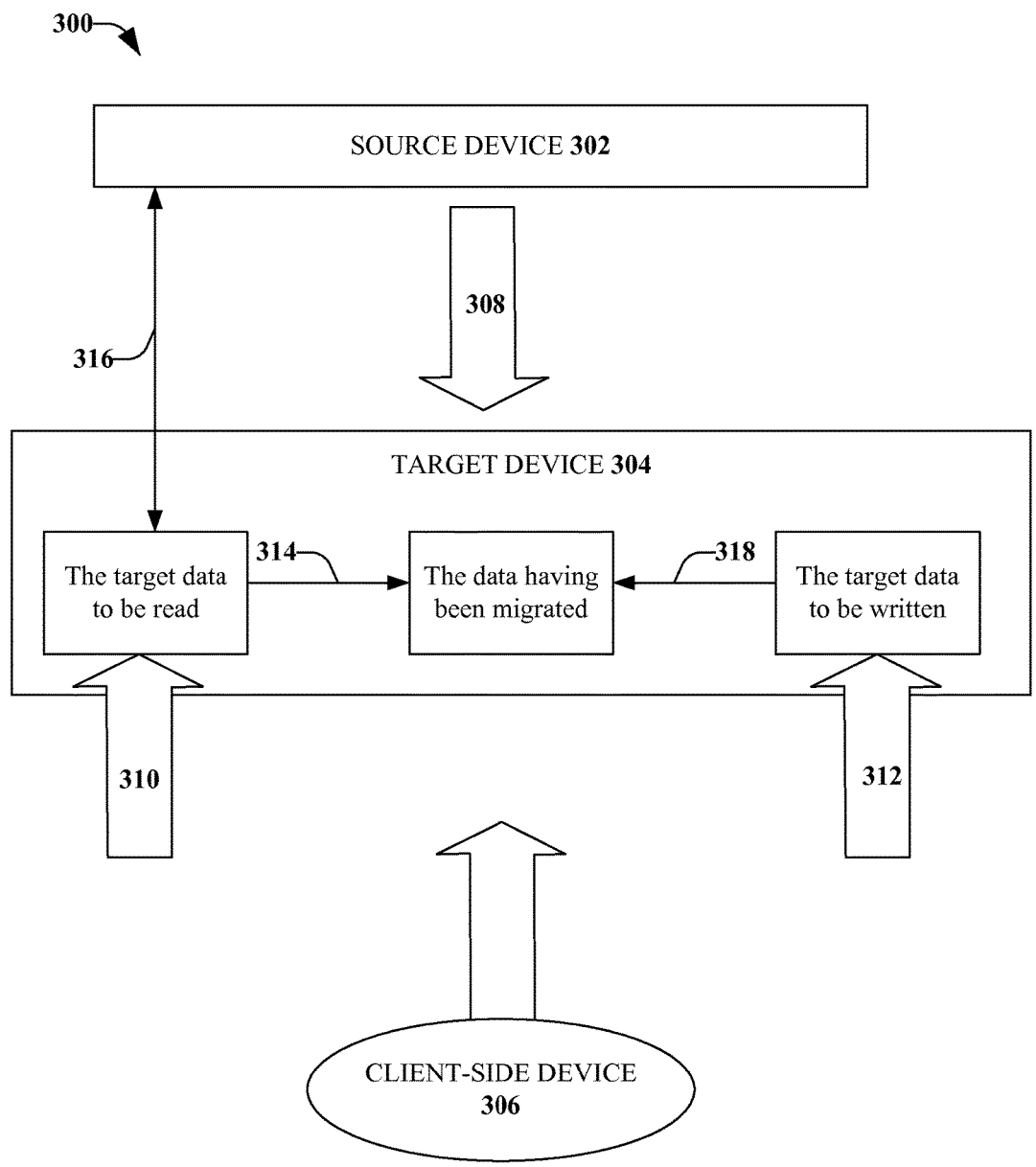
FIG. 3 illustrates an example, non-limiting embodiment of a process flow for servicing requests from communication devices while data is being migrated from source device(s) to target device(s)

FIG. 3 illustrates an example, non-limiting embodiment of a process flow 300 for servicing requests from communication devices while data is being migrated from source device(s) to target device(s). The process flow 300 demonstrates a two-level service for migration, which facilitates migrating cloud computing systems without interrupting service. During the process of migration, at least one source device 302 may function as a background device of at least one target device 304. Further, during the process of migration, the target device 304 may function as a client of the source device 302. The target device 304 may keep its services running during migration and, therefore, requests from at least one client-side device 306 may be processed. For example, if a response to the request includes data not yet migrated to the target device 304, at least a portion of the requested data may be obtained from the source device 302.

In an implementation, the system, configuration, and program related to the migration of data from the source device 302 to the target device 304 may be similar to other implementations during the operational process. Such configurations and/or programs may be migrated to the target device 304 at the beginning of the data migration process.

At about the same time as the target device 304 is started (e.g., when data migration commences), the client-side device 306 (e.g., communication devices) may be reoriented from the source device 302 to the target device 304. At substantially the same time, a link between the target device 304 and the source device 302 may be established and, therefore, the target device 304 may function as a client of the source device 302.

After the link with the source device 302 is established, at least two tasks may be performed simultaneously, or at about the same time, by the target device 304. A task can be to download the data of the source device 302 to the target device 304 over the link, illustrated at 308. In an implementation, one or more intermediary devices between the source machine and the target machine may be utilized. For example, the one or more intermediary devices may be facilitated through one or more communication network devices.

Another task may be the processing of requests from the client-side device 306. Such service requests may be to read data (read request 310) and/or to write data (write request 312). For a read request 310, the target device 304 may determine whether the data to be read has been migrated from the source device 302. If the data to be read has been migrated to the target device 304, the target device 304 may process the request directly, at 314. For example, the target device 304 may convey the data directly to the client-side device 306.

If the data to be read has not been migrated, the target device 304 may simulate the client (e.g., the client-side device 306 that sent the request) of the source device 302 to acquire the data from the source device 302, at 316. This may be similar to a direct transfer between the source device 302 and its client (e.g., the respective client-side device 306). Upon receiving the data from the source device 302, the acquired data may be stored on the target device 304.

When the request is a write request 312, if the data does not exist on the target device 304, the data can be written into the target device 304 directly from the client-side device 306. This newly written data segment can be marked as the newest data segment, at 318, which can prevent overlaying or overwriting of this data during subsequent data migration.

Figure 4:
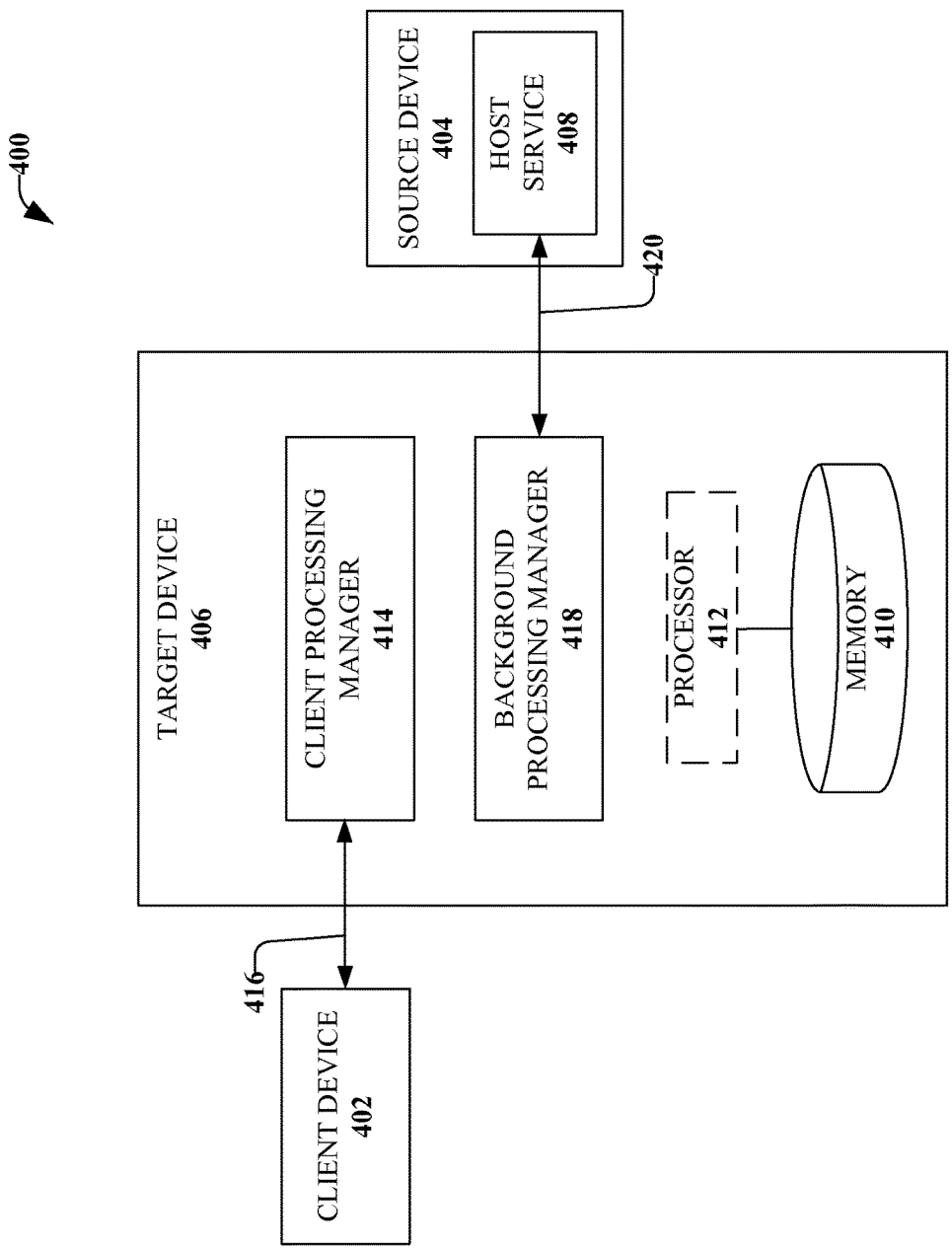
FIG. 4 illustrates a block diagram of an example, non-limiting embodiment of a system that is configured to move data between devices.

With respect to one or more non-limiting ways to implement data migration without shutdown, FIG. 4 illustrates a block diagram of an example, non-limiting embodiment of a system that is configured to move data between devices. As shown in FIG. 4, a communications system 400 is depicted that includes at least one client device 402, at least one source device 404, and at least one target device 406. The source device 404 may comprise a host service 408 that is configured to process requests from the client device 402. Although not illustrated, the source device 404 may include a data store and a processor. For example, the source device 404 may contain at least some of the data, applications, and/or services that are used by the client device 402. The source device 404 may be located on-site or within the premises or control of an enterprise (e.g., company, network, and so on). In an example, the source device 404 may be located behind a firewall of the enterprise.

The expenses of operating the host service 408 may include not only the cost of the equipment, but also costs for software to control the equipment and personnel to maintain the software and equipment. Therefore, it might be beneficial to offload the facilitation of such services to an offsite, third party provider. For example, the third party provider may provide access to the target device 406 (or a set of target devices) and provide the services originally provided by the source device 404, as well as other, additional services. Such services may include hosting the data, applications, and/or services for the client device 402. Access to the target device 406 may be provided over the Internet, on an as-needed basis.

In order for the target device 406 to service the client device 402, the data (as used herein "data" includes applications and services) from the source device 404 may be transferred (also referred to as migrated) to the target device 406. According to one or more implementations, such transfer or migration of the data may be achieved without the need to shutdown the source device 404. Thus, the data migration may be transparent to the client device 402 (e.g., the device is not aware that data migration is occurring and/or has occurred).

The target device 406 may comprise at least one memory 410 that may store computer-executable components and instructions. The target device 406 may also include at least one processor 412, communicatively coupled to the at least one memory 410. Coupling may include various communications including, but not limited to, direct communications, indirect communications, wired communications, and/or wireless communications. The processor 412 may facilitate execution of one or more of the computer-executable components stored in the memory. The processor 412 may be directly involved in the execution of the computer-executable component(s), according to an aspect. Additionally or alternatively, the processor 412 may be indirectly involved in the execution of the computer executable component(s). For example, the processor 412 may direct one or more components to perform the operations.

It is noted that although one or more computer-executable components may be described herein and illustrated as components separate from memory 410 (e.g., operatively connected to memory), in accordance with various embodiments, the one or more computer-executable components may be stored in the memory 410. Further, while various components have been illustrated as separate components, it will be appreciated that multiple components may be implemented as a single component, or a single component may be implemented as multiple components, without departing from example embodiments.

It is noted that the client device 402 and the source device 404 may comprise respective memories and processors, which are not shown for purposes of simplicity.

To facilitate non-interrupted service to the client device 402, a client processing manager 414 may be configured to establish a session 416 with the client device 402. The session 416 may replace a session that was previously established between the client device 402 and the source device 404 (e.g., link 110 of FIG. 1). A background processing manager 418 may be configured to establish a link 420 with the host service 408.

Through the session 416 established with the client device 402 and the link 420 with the host service 408, the target device 406 may function as an intermediary for the client device 402 and the host service 408. Thus, the target device 406 may receive requests from the client device 402 and may process such requests, while data is being migrated from the source device 404. Thus, there is minimum, if any, interruption of services for the client device 402.

Figure 5:
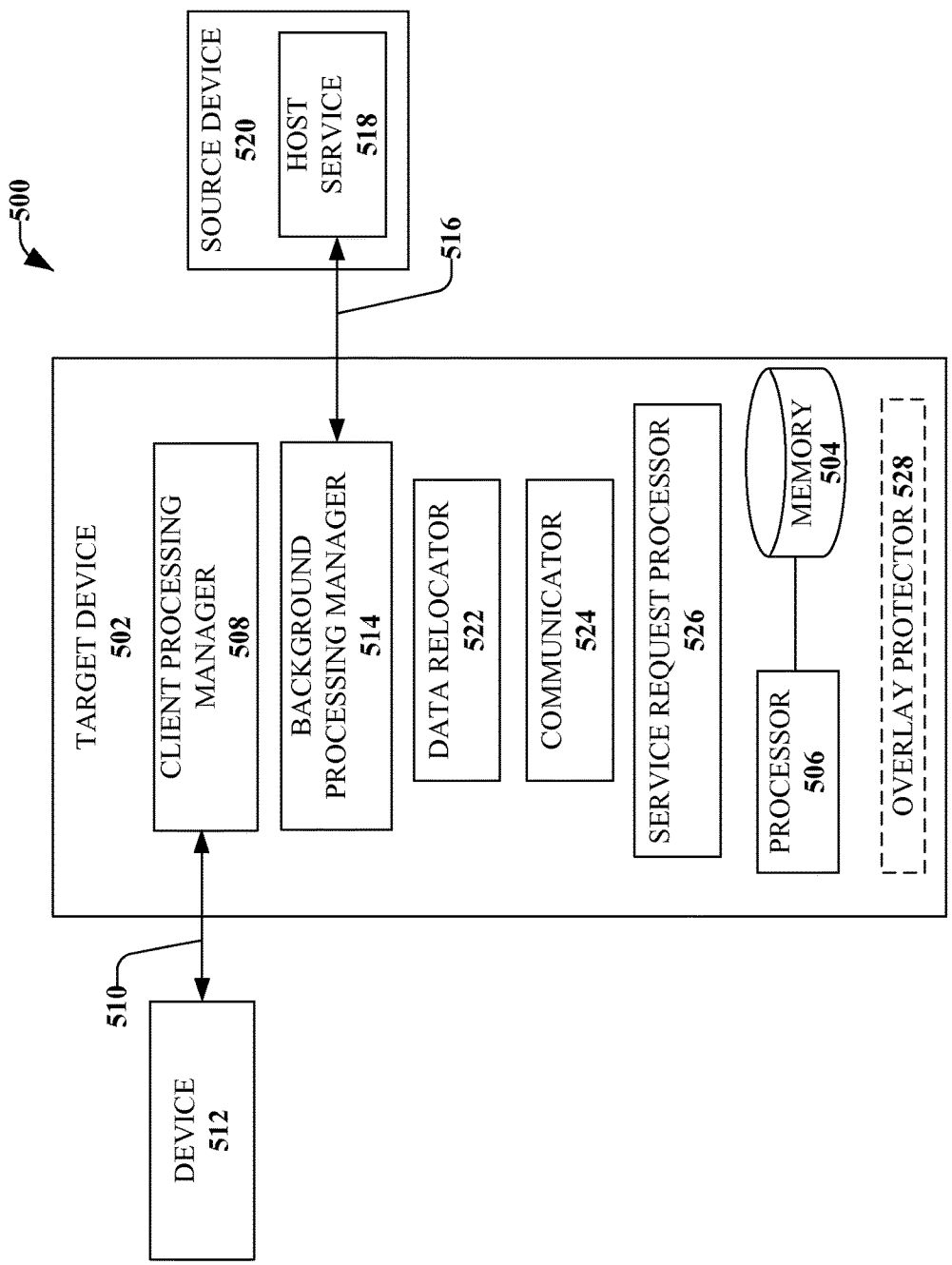
FIG. 5 illustrates a block diagram of an example, non-limiting embodiment of a system that is configured to move data between devices without interruption of service.

FIG. 5 illustrates a block diagram of an example, non-limiting embodiment of a system 500 that is configured to move data between devices without interruption of service. System 500 includes a target device 502 to which data is to be migrated. Target device 502 may be included, at least partially, in a cloud computing system.

Target device 502 includes a memory 504 storing computer-executable components and a processor 506, communicatively coupled to the memory 504. The processor 506 executes or facilitates execution of one or more of the computer-executable components stored in the memory 504. It is noted that the computer-executable components are illustrated separate from memory, however, according to various implementations, the computer-executable components may be stored, at least partially, in memory.

A client processing manager 508 may be configured to establish a communication session 510 with a device 512. A background processing manager 514 may be configured to establish a link 516 with a host service 518. In an example, the host service 518 processes requests from the device 512. In an implementation, the host service 518 may be included, at least partially, in a source device 520. According to an implementation, the background processing manager 514 may be configured to establish the link 516 with the host service 518 through at least one intermediate device. In an example, the at least one intermediate device may be a communication network device.

A data relocator 522 may be configured to migrate data from the host service 518 to the memory 504 over the link 516. In an implementation, the data relocator 522 may be further configured to determine whether or not all data from the host service 518 has been migrated to the memory 504. If all data has not been migrated, data migration from the host service 518 to the memory 504 continues. If it is determined that all data has been migrated (e.g., no other data is to be moved from the host service 518 to the memory 504), the background processing manager 514 may be configured to disable the link 516 with the host service 518, which places the host service 518 (and source device 520) in an off-line condition.

A communicator 524 may be configured to receive, over the communication session 510, a request from the device 512 for a subset of the data. The request can be a read request and/or a write request. A service request processor 526 may be configured to obtain the subset of the data from the memory 504 and/or from the host service 518. The communicator 524 may also be configured to convey the subset of the data to the device 512 in response to the request. Further, the data relocator 522 may continue to migrate the data from the host service 518 while the service request processor 526 obtains the subset of data.

According to an implementation, the request may be a read request. The service request processor 526 may be configured to search the memory 504 for the subset of the data. If the data is not found in the memory 504, the service request processor 526 may be configured to impersonate the device 512 to access the host service 518 for the data not found in the memory 504. The communicator 524 may send the data accessed from the host service 518 to the device 512. In accordance with some implementations, the client processing manager 508 may be further configured to intercept communications from the device 512. For example, the communications may include an address associated with the host service 518 and/or the source device 520.

In another implementation, the request may include a write data segment. The write data segment may be stored in the memory 504. An overlay protector 528 may be configured to identify the write data segment as non-rewritable data. For example, the overlay protector 528 may mark the write data segment as the newest data segment to prevent the data from being overwritten by other data being migrated from the host service 518.

In an example, the link 516 with the host service 518 may be a client relationship with the host service 518. The host service 518 may perform background operations while the data relocator 522 migrates data from the host service 518 to the memory 504 over the link 516. In another example, the service request processor 526 may replicate a cloud service that is transparent to the device 512. As such, the device 512 is not aware of the data migration. Further, the processing of service requests from the device 512 is not interrupted.

Figure 6:
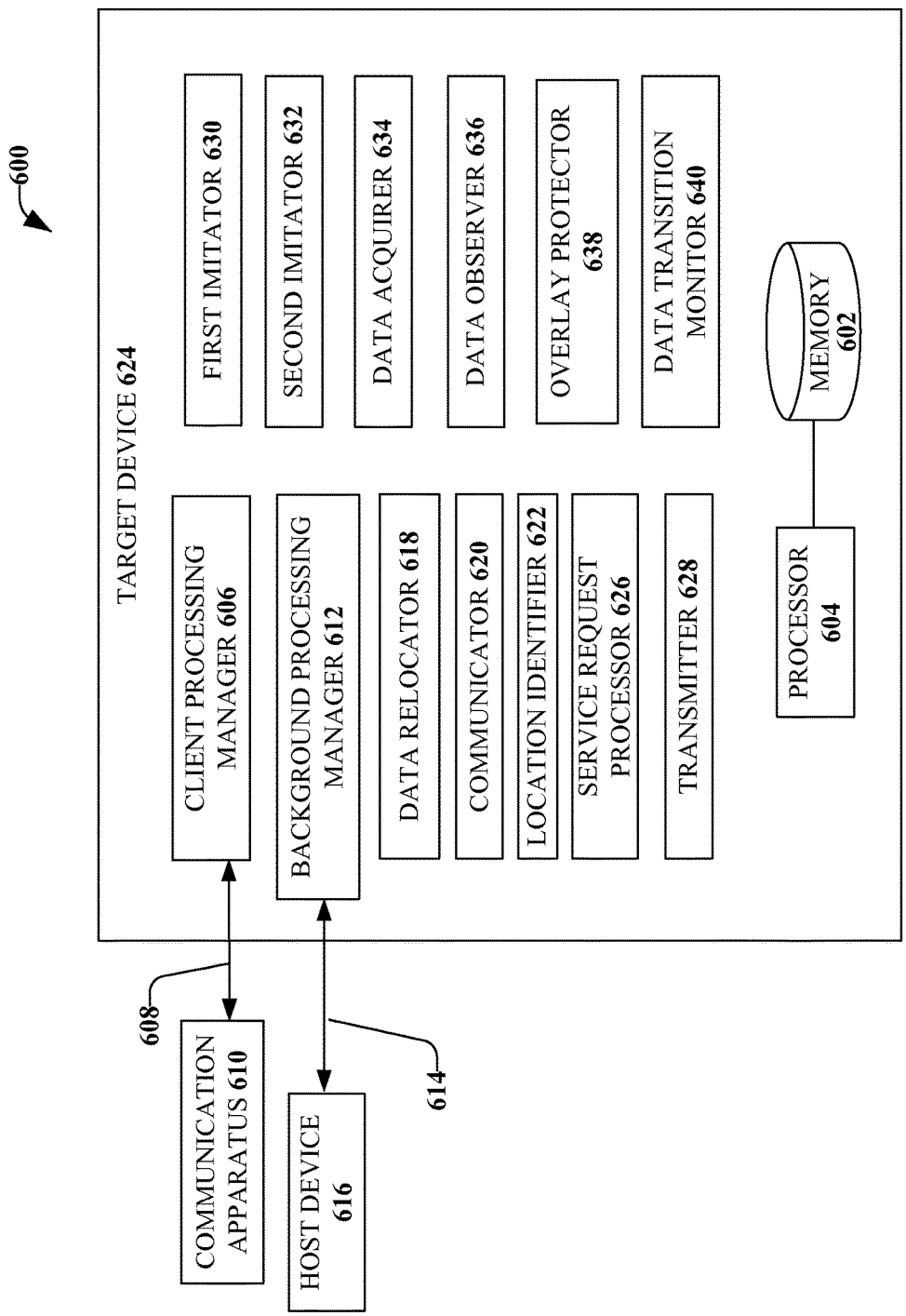
FIG. 6 illustrates a block diagram of an example, non-limiting embodiment of a system that is configured for a data migration process.

FIG. 6 illustrates a block diagram of an example, non-limiting embodiment of a system 600 that is configured for a data migration process. System 600 includes a memory 602 storing computer-executable components and a processor 604, communicatively coupled to the memory 602. The processor 604 executes or facilitates execution of one or more of the computer-executable components stored in the memory 602 or stored external to memory 602.

A client processing manager 606 may be configured to create a first communication link 608 with a communication apparatus 610 and a background processing manager 612 may be configured to create a second communication link 614 with a host device 616. The first communication link 608 and the second communication link 614 may replace a direct link between the communication apparatus 610 and the host device 616.

A data relocator 618 may be configured to transfer a plurality of data segments from the host device 616 via the second communication link 614. The memory 602 may be configured to store the plurality of data segments transferred from the host device 616. Further, a communicator 620 may be configured to receive, from the communication apparatus 610, a request for a data segment of the plurality of data segments. A location identifier 622 may be configured to determine a location of the data segment. For example, the data segment might be located on the host device 616 or might have been migrated to the target device 624 and stored in the memory 602.

A service request processor 626 may be configured to access the data segment at the location determined by the location identifier 622 and a transmitter 628 may be configured to convey a reply to the request via the first communication link 608. The reply may include the requested data. In an example, the transmitter 628 may be operatively connected to the communicator 620 or may be integrated with the communicator 620.

In an implementation, a first imitator 630 may be configured to use an identification of the host device 616 to communicate with the communication apparatus 610. A second imitator 632 may be configured to use an identifier of the communication apparatus 610 to communicate with the host device 616. Through utilization of the first imitator 630 and the second imitator 632 neither the host device 616 nor the communication apparatus 610 are aware (nor need to be aware) that the target device 624 is the device through which communication is occurring. Thus, there is no interruption of services during the data migration process.

When a read request is received from the communication apparatus 610, the location identifier 622 might determine the location of the data segment is the memory 602. Thus, a data acquirer 634 may be configured to retrieve the data segment from the memory 602. The transmitter 628 may be configured to send the data segment to the communication apparatus 610.

In another implementation, the location of the data segment may be based on a location of the host device 616. In this case, the data acquirer 634 may obtain the data segment from the host device 616 via the second communication link 614. The transmitter 628 may be configured to send the data segment to the communication apparatus 610 via the first communication link 608.

In some cases, the request from the communication apparatus 610 may be a write request. In this case, a data observer 636 may be configured to monitor the write data received from the communication apparatus 610. The memory 602 may retain the write data. Further, an overlay protector 638 may be configured to distinguish the write data from other data in the memory 602. Distinguishing the write data may prevent the data from being overwritten when subsequent data is migrated to the target device 624.

In an implementation, a data transition monitor 640 may be configured to determine the plurality of data segments have been transferred from the host device 616 (e.g., the data migration process is complete). Upon notification that the transition is complete, the background processing manager 612 may be configured to disable the second communication link 614.

Figure 7:
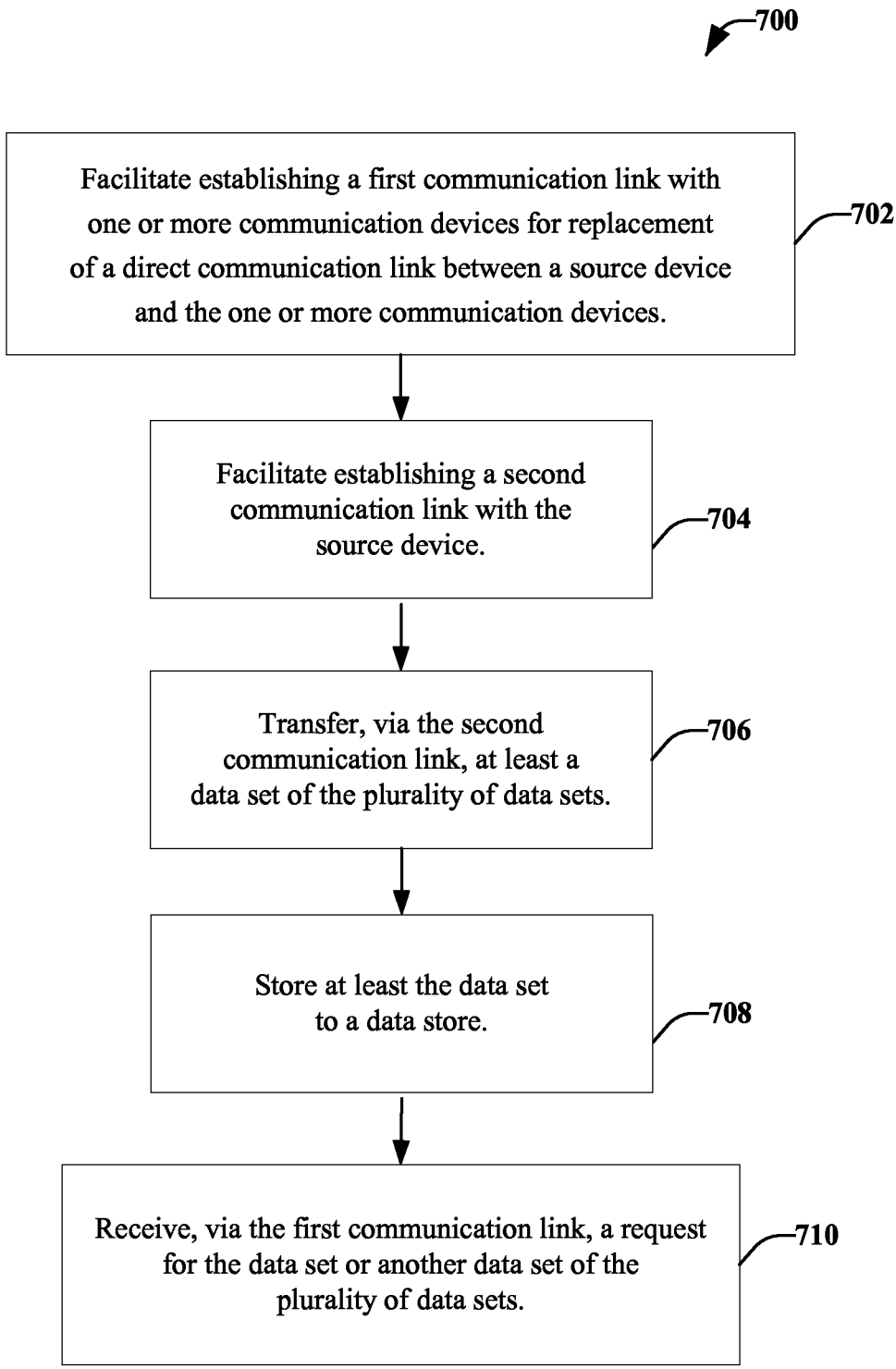
FIG. 7 is a flow diagram illustrating an example, non-limiting embodiment of a method for data transfer.

FIG. 7 is a flow diagram illustrating an example, non-limiting embodiment of a method 700 for data transfer. The flow diagram in FIG. 7 may be implemented using, for example, any of the systems, such as the communications system 400 (of FIG. 4), described herein. An example utilized throughout this description is of a source device, a target device, and a communication device. The source device may be, for example a server of an enterprise (e.g., a company). The target device may be located offsite, or "in the cloud". Further, according to some implementations, there may be more than one target device, such as a set of target devices. The communication device may be user equipment devices (e.g., computer, cell phone). However, it is to be appreciated that the embodiments described herein are not limited to the specific example of a source device, a target device, and/or a communication device and that the embodiments described herein are comprehended to function with other devices.

Beginning at block 702, establishment of a first communication link may be facilitated. The first communication link may be established with one or more communication devices. For example, the one or more communication devices may be one of a multitude of different devices, such as computers and/or other programmable devices. Further, the first communication link may replace a direct communication link between a source device and the one or more communication devices.

In an example, the source device may be one of many different types of devices including computers, servers, mainframes, mini computers, and/or other programmable devices. In an implementation, there may be more than one source device, such as devices implemented in a distributed computing environment. For example, the source device(s) may be implemented in connection with any computer or other client or server device, which may be deployed as part of a computer network or in a distributed computing environment, and may be connected to any kind of data store. In this regard, the various embodiments described herein may be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

In an example, the source device may comprise a multitude of data sets. For example, the data sets may be stored in a data store or other storage media of source device. In another example, the data sets may be stored external to source device and accessible by source device. For example, the data sets may be stored in an external (e.g., external to source device) on another device and accessible over a distributed computing network. Block 702 may be followed by block 704.

At block 704, establishment of a second communication link with the source device may be facilitated. The second communication link may be established between a target device and the source device. Block 704 may be followed by block 706. At block 706, at least a data set of the plurality of data sets may be transferred via the second communication link. Additional data sets of the plurality of data sets may be transferred over the second communication link according to various implementations. Block 706 may be followed by block 708.

At block 708, at least the data set may be stored to a data store. The data store may be associated with the target device. For example, the data store may be communicatively coupled to the target device, however, in some implementations, the data store may be integrated with the target device. Block 708 may be followed by block 710.

At block 710, a request for the data set or another data set of the plurality of data sets may be received. The request may be received from a communication device of the one or more communication devices. The request may be a read request and/or a write request. A read request may be processed using data already migrated to the target device and/or using data selectively retrieved from the source device on behalf of the communication device. A data segment related to the write request may be stored in the data store and marked as new data to prevent overwriting of the new data with other data migrated from the source device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
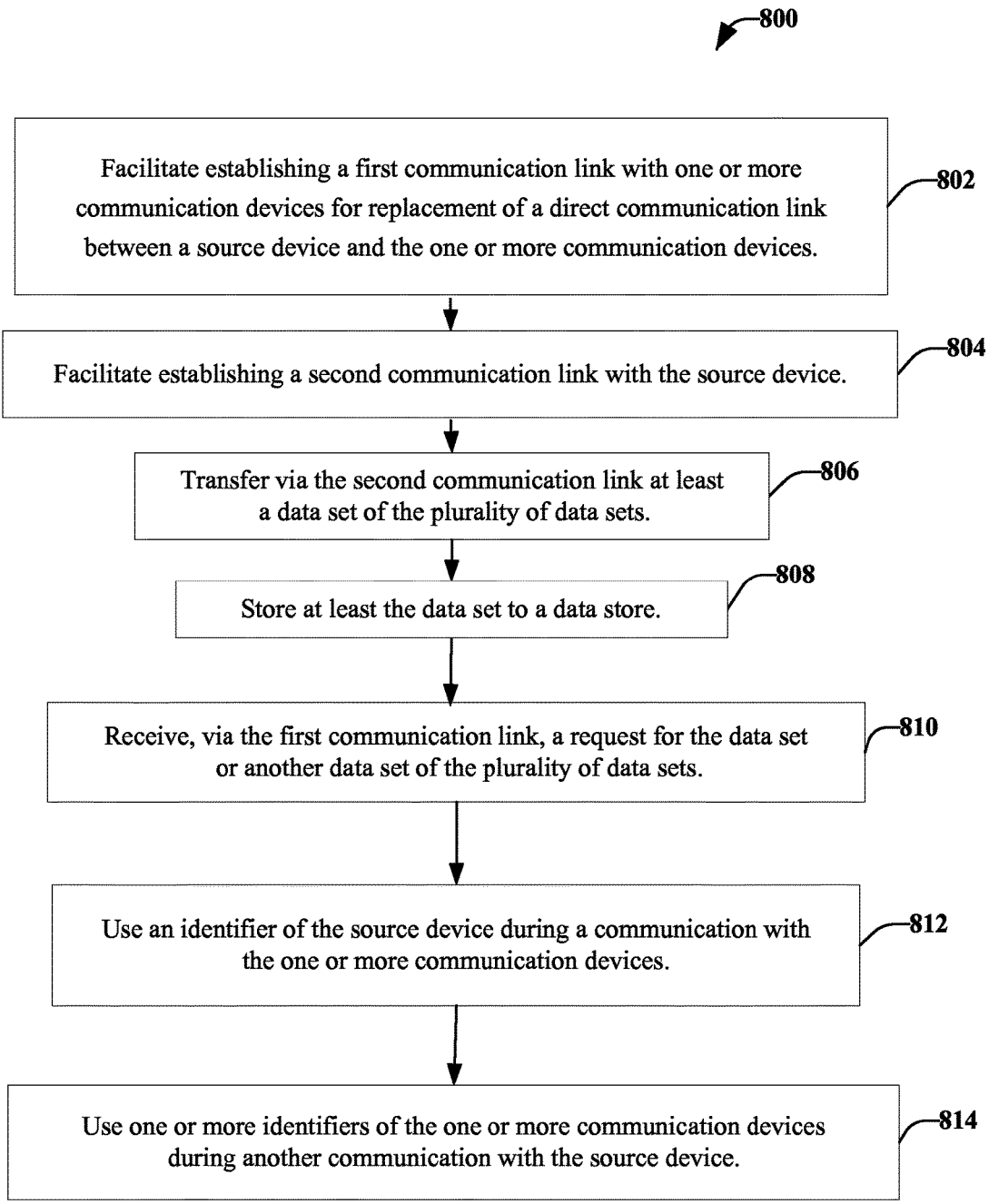
FIG. 8 is a flow diagram illustrating an example, non-limiting embodiment of a method for two-level data migration without shutdown.

FIG. 8 is a flow diagram illustrating an example, non-limiting embodiment of a method 800 for a two-level cloud system data migration without shutdown. The flow diagram in FIG. 8 may be implemented using, for example, any of the systems, such as the system 500 (of FIG. 5), described herein.

Beginning at block 802, establishment of a first communication link with one or more communication devices for replacement of a direct communication link between a source device and the one or more communication devices may be facilitated. The source device may comprise a plurality of data sets. Block 802 may be followed by block 804.

At block 804, establishment of a second communication link with the source device may be facilitated. Block 804 may be followed by block 806. At least a data set of the plurality of data sets may be transferred via the second communication link, at block 806. Block 806 may be followed by block 808. At least the data set may be stored to a data store, at block 808. Block 808 may be followed by block 810. A request for the data set or another data set of the plurality of data sets may be received, at block 810. The request may be received via the first communication link. Further, the request may be received from a communication device of the one or more communication devices. Block 810 may be followed by block 812.

According to an implementation, at block 812 an identifier of the source device may be used during a communication with the one or more communication devices. Using the identifier of the source device may facilitate data migration without the communication devices being aware that there has been a server change. This may also facilitate a non-interruption of services for the communication devices. Block 812 may be followed by block 814.

At block 814, one or more identifiers of the one or more communication devices may be used during another communication with the source device. For example, using the respective identifiers of the communication devices may facilitate mirroring a functionality of the respective device to access the host service for data not found in the memory or data store of the target device. Therefore, service requests may be processed during the data migration without disrupting services and without taking the source device offline during the migration process.

Figure 9:
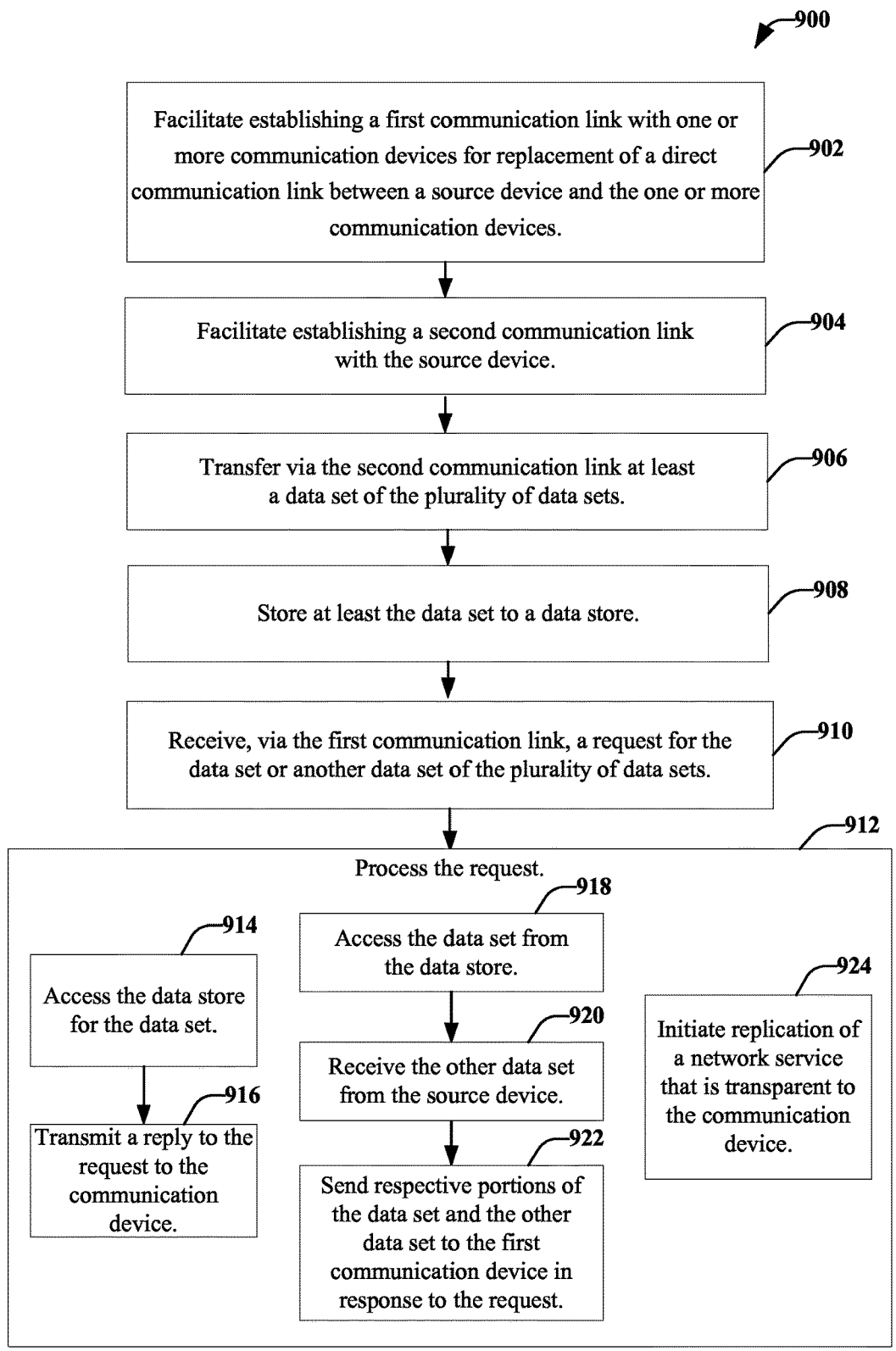
FIG. 9 is a flow diagram illustrating an example, non-limiting embodiment of a method for processing a client request during data migration.

FIG. 9 is a flow diagram illustrating an example, non-limiting embodiment of a method 900 for processing a client request during data migration. The method 900 in FIG. 9 may be implemented using, for example, any of the systems, such as the system 500 (of FIG. 5), described herein and may be used to process the client request.

Beginning at block 902, establishment of a first communication link with one or more communication devices for replacement of a direct communication link between a source device and the one or more communication devices may be facilitated. The source device may comprise a plurality of data sets. Block 902 may be followed by block 904.

At block 904, establishment of a second communication link with the source device may be facilitated. Block 904 may be followed by block 906. At least a data set of the plurality of data sets may be transferred via the second communication link, at block 906. Block 906 may be followed by block 908. At least the data set may be stored to a data store, at block 908. Block 908 may be followed by block 910. A request for the data set or another data set of the plurality of data sets may be received, at block 910. The request may be received via the first communication link. Further, the request may be received from a first communication device of the one or more communication devices. Block 910 may be followed by block 912. At block 912, the request may be processed.

In an implementation, the request may be a read request for the data set and block 912 may include block 914 and block 916. Further to this implementation, at block 914, the data store may be accessed for the data set. Block 914 may be followed by block 916. At 916, a reply to the request may be transmitted to the communication device. The reply may comprise at least a portion of the data set.

According to another implementation, block 912 may include block 918, block 920, and block 922. Further to this implementation, processing the request may include accessing the data set from the data store, at block 918. The data set may be data that has already been transferred from the source device. Block 918 may be followed by block 920. The other data set may be received from the source device, at block 920. For example, the other data set may be data that has not yet been transferred from the source device but is used to service the client request. Block 920 may be followed by block 922. Respective portions of the data set and the other data set may be sent to the communication device, at block 922, in response to the request. The other data set may be stored in the data store.

In a further implementation, block 912 may include block 924. The processing the request may include initiating replication of a network service that is transparent to the communication device at block 924. For example, initiating replication of the network service may include impersonating the source device through the utilization of an identification of the source device to communicate with the client devices. Replication of the network service facilitates non-interruption of data services to the client devices.

Figure 10:
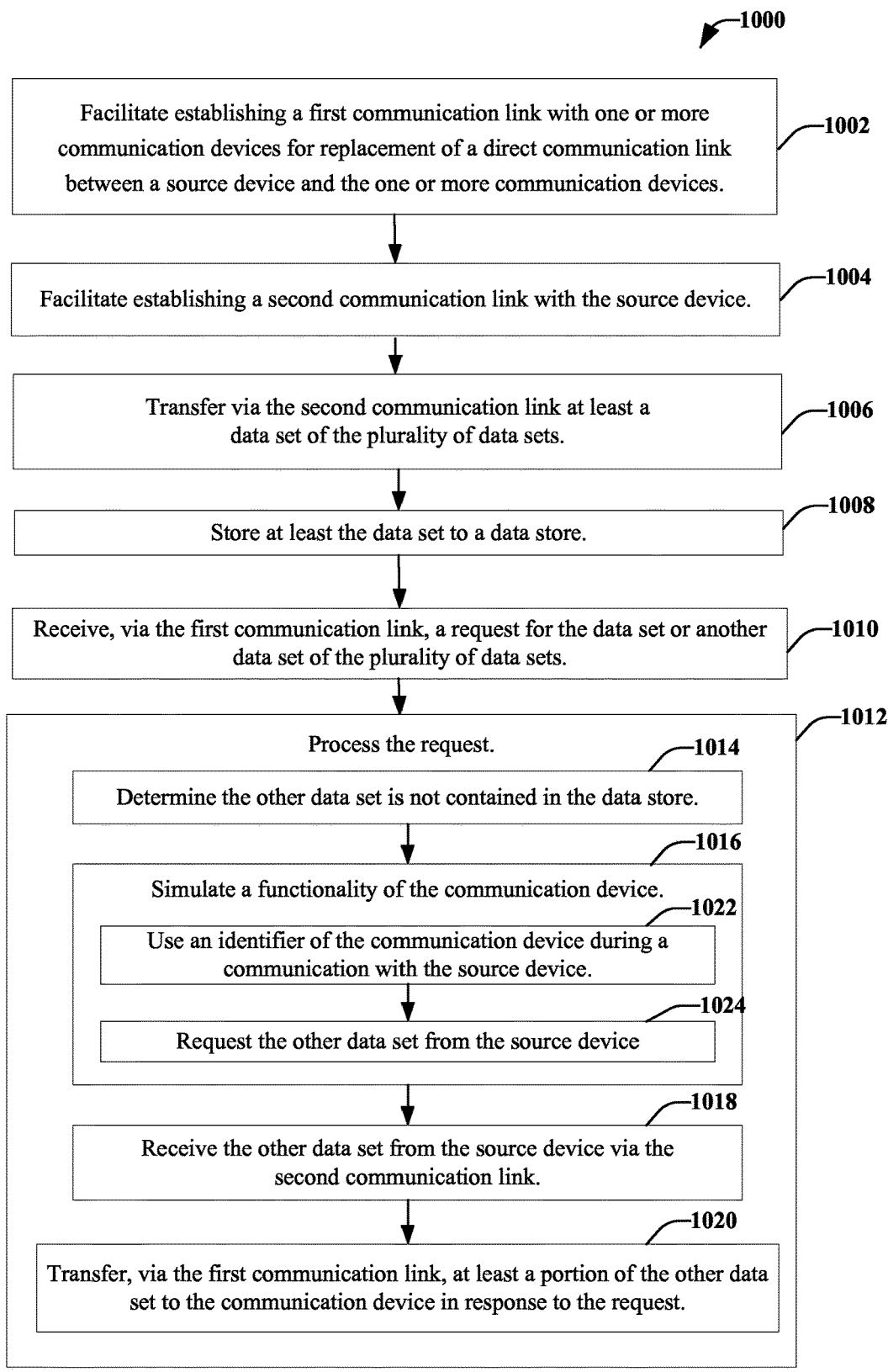
FIG. 10 is a flow chart illustrating an example, non-limiting embodiment of a method for processing a request during data migration when the requested data is located on different devices.

FIG. 10 is a flow chart illustrating an example, non-limiting embodiment of a method 1000 for processing a request during data migration when the requested data is located on different devices. The flow diagram in FIG. 10 may be implemented using, for example, any of the systems, such as the system 500 (of FIG. 5), described herein.

Beginning at block 1002, establishment of a first communication link with one or more communication devices for replacement of a direct communication link between a source device and the one or more communication devices is facilitated. The source device may comprise a plurality of data sets. Block 1002 may be followed by block 1004.

At block 1004, establishment of a second communication link with the source device is facilitated. Block 1004 may be followed by block 1006. At least a data set of the plurality of data sets is transferred via the second communication link, at block 1006. Block 1006 may be followed by block 1008. At least the data set is stored to a data store, at block 1008. Block 1008 may be followed by block 1010. A request for the data set or another data set of the plurality of data sets may be received, at block 1010. The request may be received via the first communication link. Further, the request may be received from a communication device of the one or more communication devices. Block 1010 may be followed by block 1012.

At block 1012, the request is processed. For example, the request may be a read request for the other data set. Further to this implementation, block 1012 may include block 1014. At block 1014, a determination is made that the other data set is not contained in the data store. Block 1014 may be followed by block 1016. At block 1016, functionality of the communication device is simulated. For example, an identifier of the communication device may be used to request the other data set from a source device. Block 1016 may be followed by block 1018. At block 1018, the other data set from the source device is received via the second communication link. Block 1018 may be followed by block 1020. At block 1020, at least a portion of the other data set is transferred via the first communication link, to the communication device in response to the request. According to an implementation, the method 1000 may include storing the other data set in the data store.

In accordance with some implementations, simulating the functionality of the communication device, at block 1016, may include using an identifier of the communication device, at block 1022. The identifier of the communication device may be used during a communication with the source device. Block 1022 may be followed by block 1024. At block 1024, the other data may be requested from the source device. Block 1024 may be followed by block 1018 as discussed herein.

Figure 11:
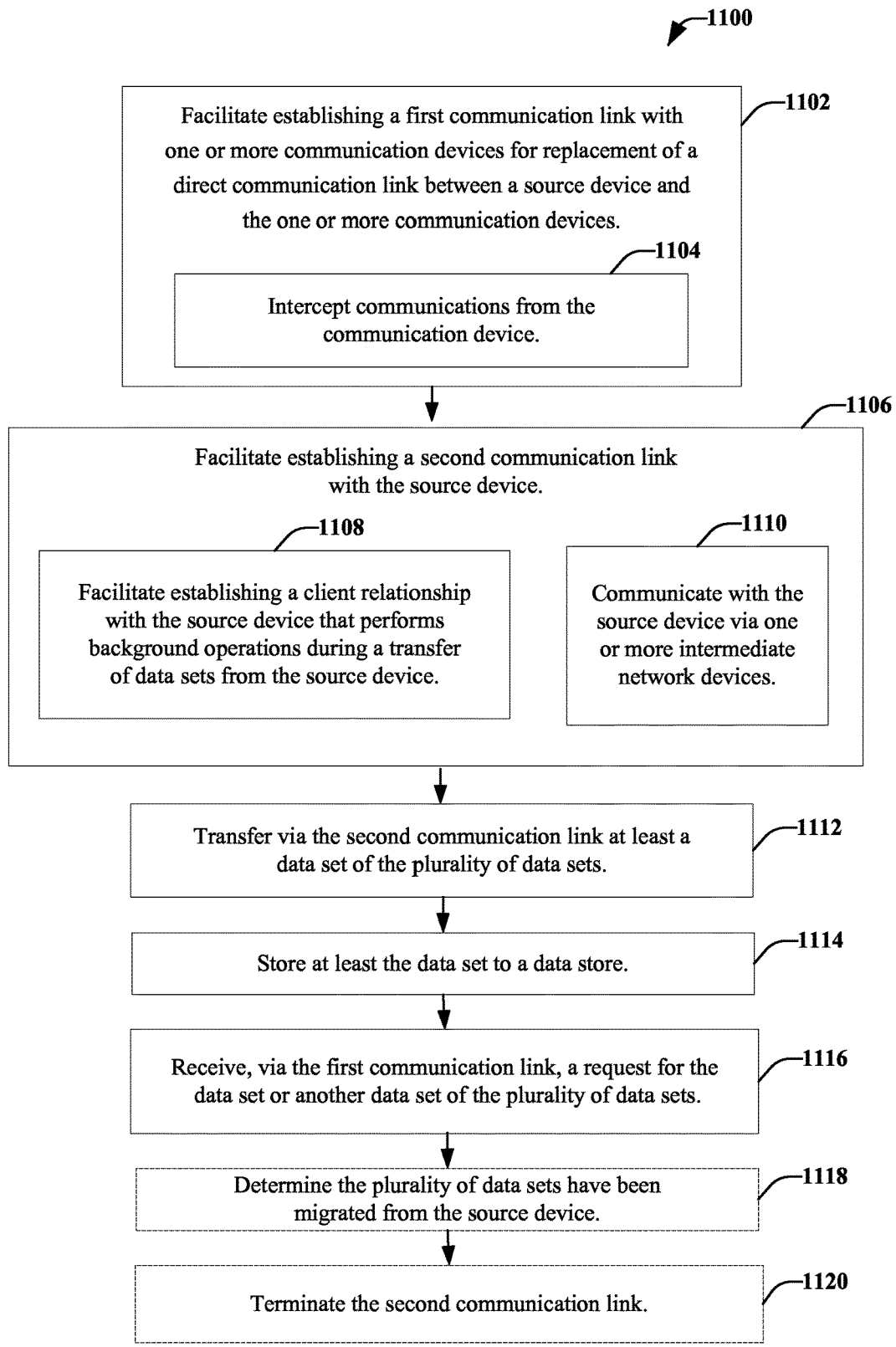
FIG. 11 is a flow chart illustrating an example, non-limiting embodiment of a method for servicing a client device while data is being migrated from a source device to a target device.

FIG. 11 is a flow chart illustrating an example, non-limiting embodiment of a method 1100 for servicing a client device while data is being migrated from a source device to a target device. The flow diagram in FIG. 11 may be implemented using, for example, any of the systems, such as the system 500 (of FIG. 5), described herein.

Beginning at block 1102, establishment of a first communication link with one or more communication devices for replacement of a direct communication link between a source device and the one or more communication devices is facilitated. The source device may comprise a plurality of data sets. According to an implementation, establishment of the first communication link may include intercepting, at block 1104, communications from the communication device. For example, the communications from the communication device may be intercepted based on an identifier associated with the source device.

Block 1102 and/or block 1104 may be followed by block 1106. At block 1106, facilitation of establishment of a second communication link with the source device may be performed. According to an implementation, block 1106 may include block 1108. For example, establishing the second communication link may include facilitating establishment of a client relationship with the source device at block 1108. The source device may perform background operations during a transfer of data sets from the source device. According to a further implementation, block 1106 may include block 1110. For example, establishing the second communication link may include communicating with the source device via one or more intermediate network devices, at block 1110. Block 1106 may be followed by block 1112.

At least a data set of the plurality of data sets is transferred via the second communication link, at block 1112. Further, block 1112 may be followed by block 1114. At least the data set is stored to a data store, at block 1114. Block 1114 may be followed by block 1116. A request for the data set or another data set of the plurality of data sets is received, at block 1116. The request may be received via the first communication link. Further, the request may be received from a communication device of the one or more communication devices.

In accordance with some implementations, block 1116 may be followed by block 1118. Thus, the method 1100 may include determining, at block 1118, that the plurality of data sets have been migrated from the source device. Block 1118 may be followed by block 1120. Based upon this determination, at block 1120, the second communication link is terminated. At this point, the source device is off-line and is no longer used for servicing client requests as all data has been migrated to the cloud.

Figure 12:
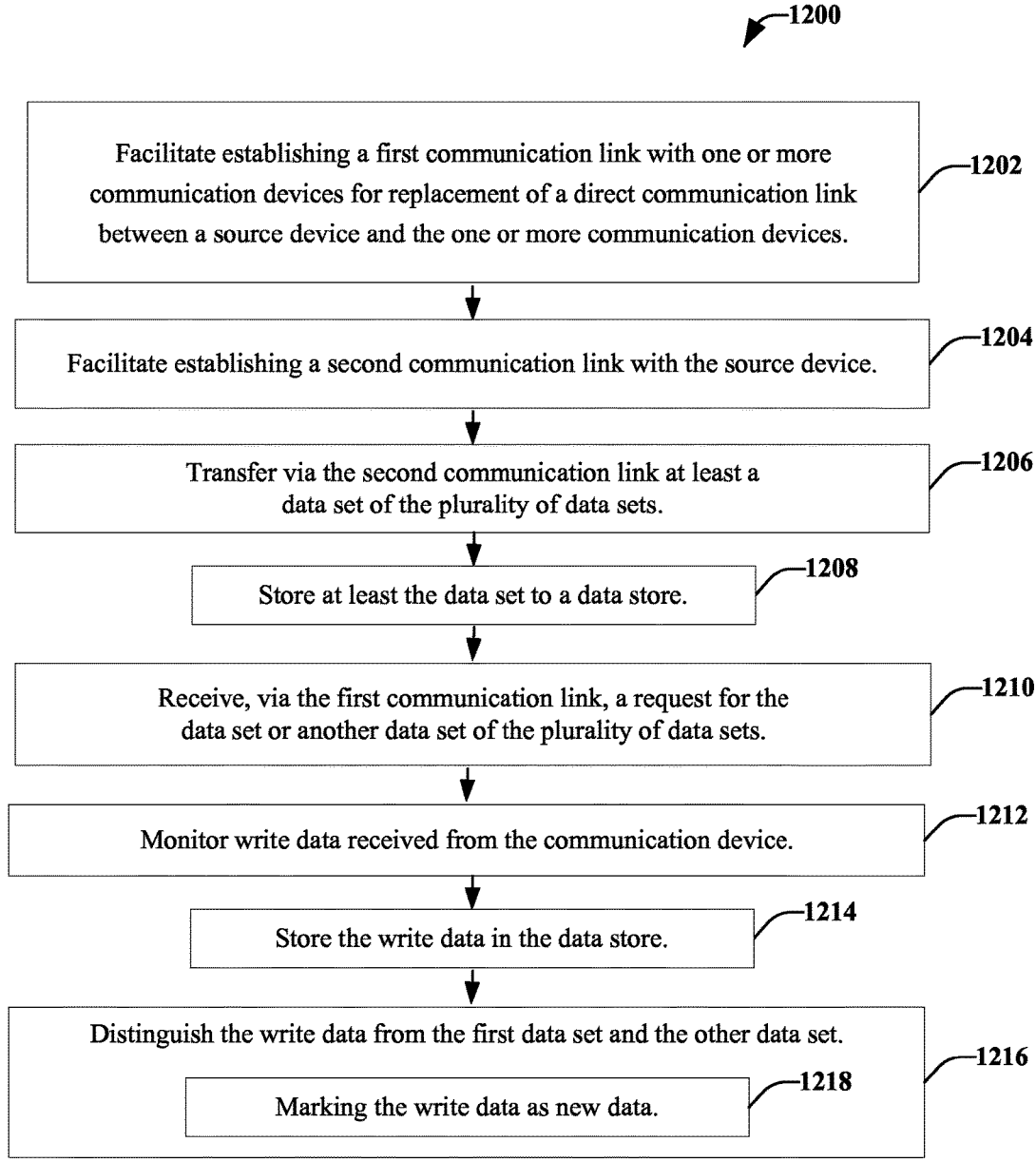
FIG. 12 is a flow chart illustrating an example, non-limiting embodiment of a method for processing a write request during data migration.

FIG. 12 is a flow chart illustrating an example, non-limiting embodiment of a method 1200 for processing a write request during data migration. The flow diagram in FIG. 12 may be implemented using, for example, any of the systems, such as the system 600 (of FIG. 6), described herein.

Beginning at block 1202, establishment of a first communication link with one or more communication devices for replacement of a direct communication link between a source device and the one or more communication devices is facilitated. The source device can comprise a plurality of data sets. Block 1202 may be followed by block 1204.

At block 1204, establishment of a second communication link with the source device is facilitated. Block 1204 may be followed by block 1206. At least a data set of the plurality of data sets is transferred via the second communication link, at block 1206. Block 1206 may be followed by block 1208. At least the data set is stored to a data store, at block 1208. Block 1208 may be followed by block 1210.

A request for the data set or another data set of the plurality of data sets is received, at block 1210. The request may be received via the first communication link. Further, the request may be received from a communication device of the one or more communication devices. Block 1210 may be followed by block 1212.

At block 1212 write data received from the communication device is monitored. Block 1212 may be followed by block 1214. The write data is stored in the data store, at block 1214. Further, block 1214 may be followed by block 1216.

At block 1216, the write data is distinguished from the first data set and the other data set. According to an implementation, block 1216 may include block 1218. In this implementation, the distinguishing may include marking the write data as new data, at block 1218.

Figure 13:
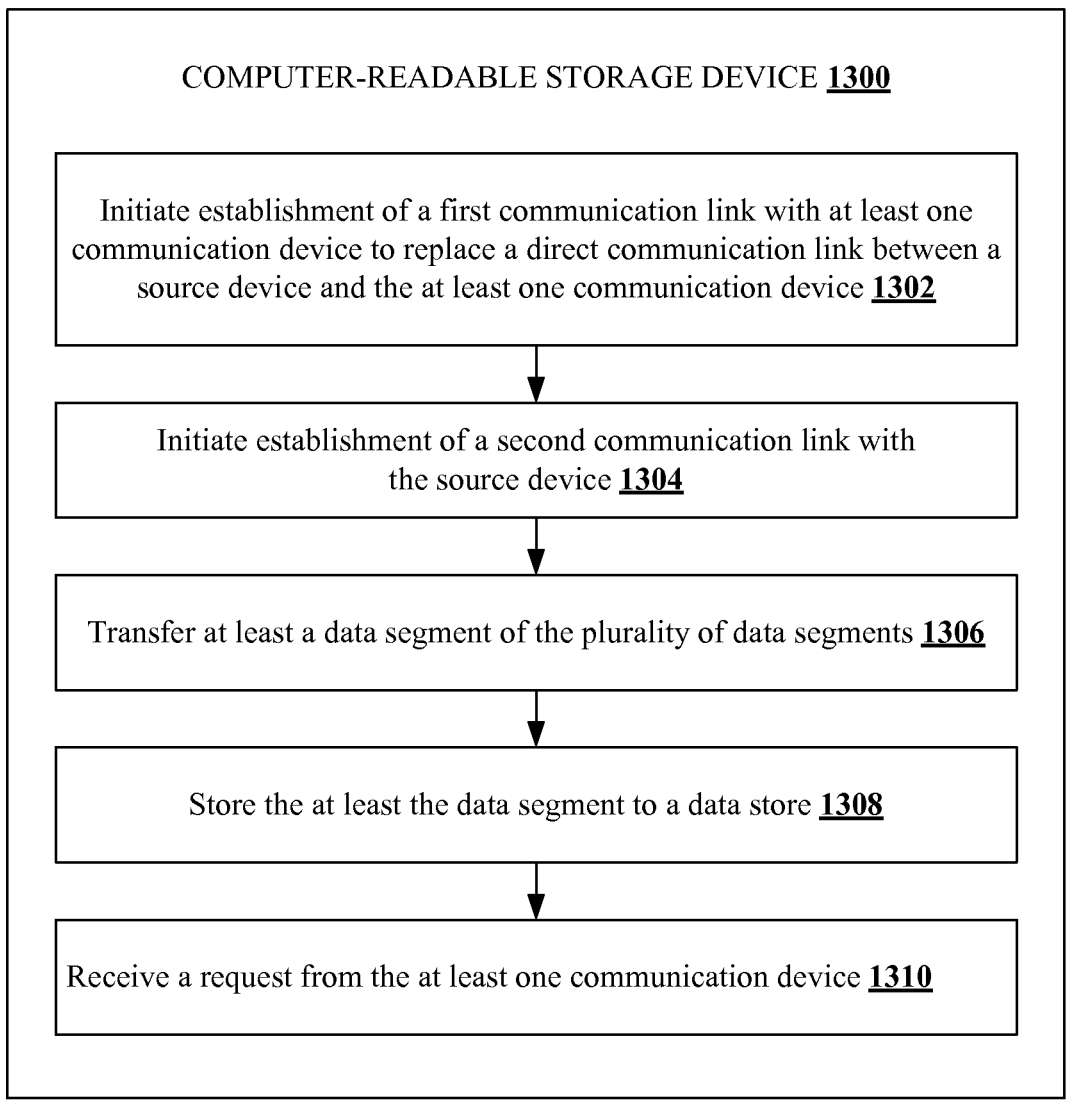
FIG. 13 illustrates a flow diagram of an example, non-limiting embodiment of a set of operations for transfer of data from a source device to a target device in accordance with at least some aspects of the subject disclosure.

FIG. 13 illustrates a flow diagram of an example, non-limiting embodiment of a set of operations for transfer of data from a source device to a target device in accordance with at least some aspects of the subject disclosure. Computer-readable storage device 1300 may include computer executable instructions that, in response to execution, cause a system comprising a processor to perform the operations.

At 1302, these operations may cause the system to initiate establishment of a first communication link with at least one communication device to replace a direct communication link between a source device and the at least one communication device. The source device may comprise a plurality of data segments. At 1304, the operations may cause the system to initiate establishment of a second communication link with the source device.

At 1306, the operations may cause the system to transfer at least a data segment of the plurality of data segments. The data segment may be transferred via the second communication link. At 1308, the operations may cause the system to store at least the data segment to a data store.

At 1310, the operations may cause the system to receive a request from the at least one communication device. The request may be received via the first communication link. In an example, the request is for the data segment or another data segment of the plurality of data segments.

In an implementation, the operations may cause the system to use an identifier of the source device during a communication with the at least one communication device. Further to this implementation, the operations may cause the system to use at least one identifier of the at least one communication device during a communication with the source device.

In another implementation, the operations may cause the system to access the data store for the data segment and determine the other data segment is not contained in the data store. Further to this implementation, the operations may cause the system to simulate a functionality of the at least one communication device and obtain the other data segment from the source device via the second communication link. In addition, the operations may cause the system to transfer, via the first communication link, respective portions of the data segment and the other data segment to the at least one communication device in response to the read request.

According to another implementation, the operations may include intercepting communications from the at least one communication device, wherein the communications comprise an identifier associated with the source device. In still another implementation, the operations may include determining that the plurality of data segments have been migrated from the source device and terminating the second communication link.

In accordance with another implementation, the operations may include monitoring write data received from the at least one communication device and storing the write data to the data store. Further to this implementation, the operations may include distinguishing the write data from the first data segment and the other data segment.

As discussed herein, various non-limiting embodiments are directed to a two-level service to implement data migration. A data migration process can be facilitated without interrupting service. For example, during the process of migration, source machines may function as background devices of target machines. Further, during the data migration process, the target machines may function as clients of the source machines. For example, the target machines may keep their services running during migration and, if necessary, data can be obtained from the source machines to service a client request. Therefore, client devices are not aware that data migration is occurring or that data migration has occurred.

Example Computing Environment

Figure 14:
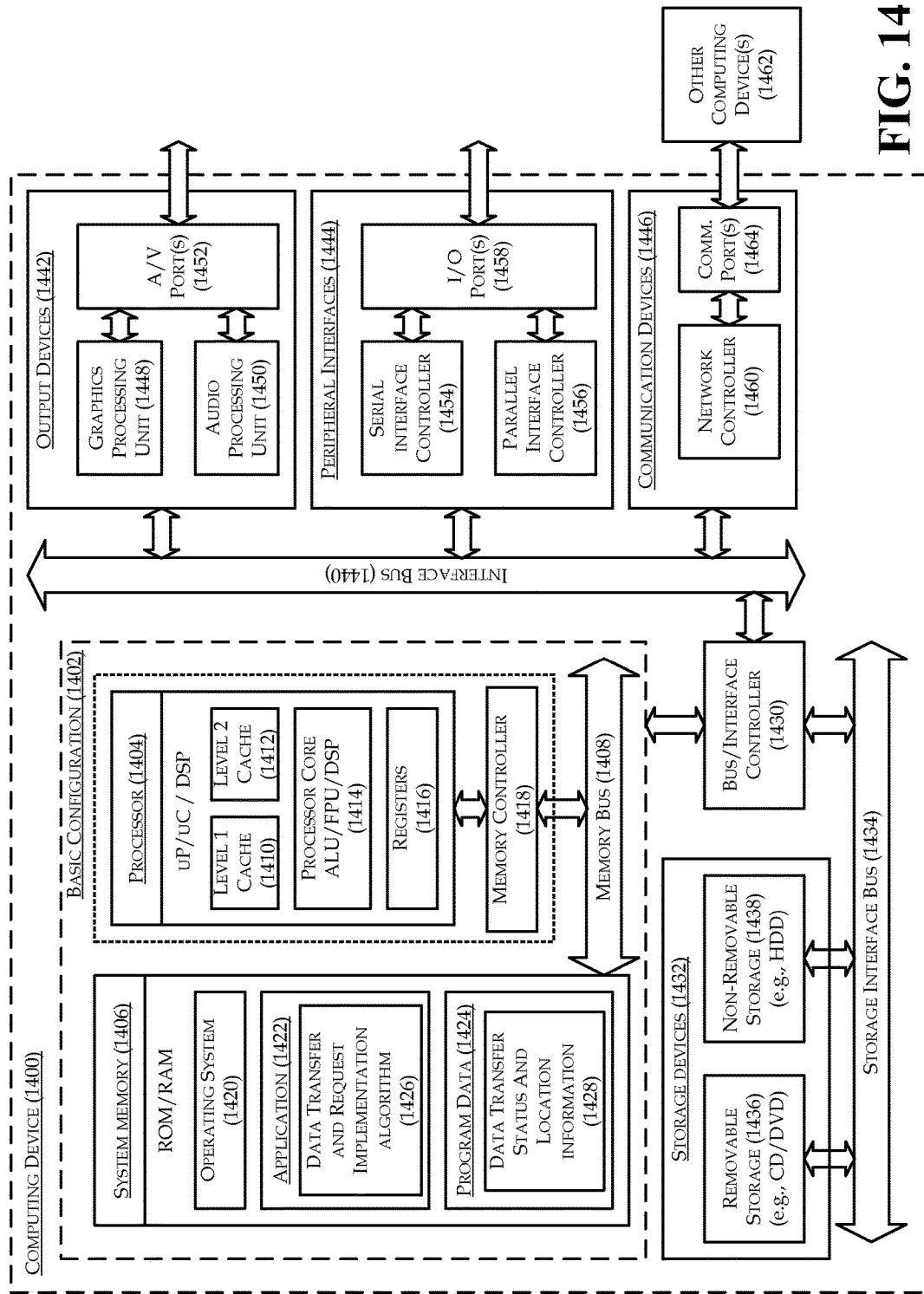
FIG. 14 is a block diagram illustrating an example computing device that is arranged for migration of data with non-interruption of service in accordance with at least some embodiments of the subject disclosure.

FIG. 14 is a block diagram illustrating an example computing device 1400 that is arranged for data migration without shutdown in accordance with at least some embodiments of the subject disclosure. In a very basic configuration 1402, computing device 1400 may include one or more processors 1404 and a system memory 1406. A memory bus 1408 may be used for communicating between processor 1404 and system memory 1406.

Depending on the desired configuration, processor 1404 may be of any type including but not limited to a microprocessor (µP), a microcontroller (µC), a digital signal processor (DSP), or any combination thereof. Processor 1404 may include one more levels of caching, such as a level one cache 1410 and a level two cache 1412, a processor core 1414, and registers 1416. An example processor core 1414 may include an arithmetic logic unit (ALU), a floating point unit (FPU), a digital signal processing core (DSP Core), or any combination thereof. An example memory controller 1418 may also be used with processor 1404, or in some implementations memory controller 1418 may be an internal part of processor 1404.

Depending on the desired configuration, system memory 1406 may be of any type including but not limited to volatile memory (such as RAM), non-volatile memory (such as ROM, flash memory, etc.) or any combination thereof. System memory 1406 may include an operating system 1420, one or more applications 1422, and program data 1424. Application 1422 may include a data transfer and request implementation algorithm 1426 that is arranged to perform the functions as described herein including those described with respect to the data migration based system 500 of FIG. 5. Program data 1424 may include data transfer status and location information 1428 that may be useful for operation with data transfer and request implementation algorithm 1426 as is described herein. In some embodiments, application 1422 may be arranged to operate with program data 1424 on operating system 1420 such that a transparent and responsive data migration experience may be provided. This described basic configuration 1402 is illustrated in FIG. 14 by those components within the inner dashed line.

Computing device 1400 may have additional features or functionality, and additional interfaces to facilitate communications between basic configuration 1402 and any required devices and interfaces. For example, a bus/interface controller 1430 may be used to facilitate communications between basic configuration 1402 and one or more data storage devices 1432 via a storage interface bus 1434. Data storage devices 1432 may be removable storage devices 1436, non-removable storage devices 1438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1406, removable storage devices 1436, and non-removable storage devices 1438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1400. Any such computer storage media may be part of computing device 1400.

Computing device 1400 may also include an interface bus 1440 for facilitating communication from various interface devices (e.g., output devices 1442, peripheral interfaces 1444, and communication devices 1446) to basic configuration 1402 via bus/interface controller 1430. Example output devices 1442 include a graphics processing unit 1448 and an audio processing unit 1450, which may be configured to communicate to various external devices such as a display or speakers via one or more A/V ports 1452. Example peripheral interfaces 1444 include a serial interface controller 1454 or a parallel interface controller 1456, which may be configured to communicate with external devices such as input devices (e.g., mouse, pen, voice input device, etc.) or other peripheral devices (e.g., printer, scanner, etc.) via one or more I/O ports 1458. An example communication device 1446 includes a network controller 1460, which may be arranged to facilitate communications with one or more other computing devices 1462 over a network communication link via one or more communication ports 1464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The subject disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the vehicle will vary with the context in which the processes and/or systems and/or other technologies are deployed. For example, if an implementer determines that speed and accuracy are paramount, the implementer may choose a mainly hardware and/or firmware vehicle; if flexibility is paramount, the implementer may choose a mainly software implementation; or, yet again alternatively, the implementer may choose some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to", "at least", and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the various aspects have been elaborated by various figures and corresponding descriptions, features described in relation to one figure are included in the aspects as shown and described in the other figures. Merely as one example, the "target device" described in relation to FIG. 5 is also a feature in the aspect as shown in FIG. 2, FIG. 3, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A method performed by a system that includes a processor, the method comprising:

facilitating establishing a first communication link between the system and a source device, wherein the source device comprises a plurality of data sets;

receiving, via the first communication link, at least a data set of the plurality of data sets, from the source device, by intercepting communications between a communication device and the source device;

storing at least the data set to a data store;

while receiving by the system the at least the data set, facilitating establishing a second communication link between the system and one or more communication devices for replacement of a direct communication link between the source device and the one or more communication devices, wherein establishing the second communication link, while receiving by the system the at least the data set, facilitates continued access to the data set or another data set, by the one or more communication devices, via the second communication link;

receiving, via the second communication link, a request for the data set or the other data set of the plurality of data sets, wherein the request is received from a communication device of the one or more communication devices; and processing the request received from the communication device of the one or more communication devices, wherein the processing the request comprises:

determining that the other data set is absent in the data store of the system;

receiving, based on the determination, the other data set from the source device via the first communication link by using an identifier of the communication device to communicate with the source device, wherein the usage of the identifier of the communication device facilitates the source device to determine that the request is received from the communication device; and transferring, via the second communication link, at least a portion of the other data set to the communication device in response to the request, wherein the transferring is performed by the system using the identifier of the source device;

wherein the processing the request comprises initiating replication of a network service that is transparent to the communication device.

2. The method of claim 1, further comprising:

using an identifier of the source device during a communication with the one or more communication devices; and using one or more identifiers of the one or more communication devices during another communication with the source device.

3. The method of claim 1, wherein the processing the requester further comprises:

accessing the data store for the data set; and transmitting, in response to the request, a reply to the communication device, wherein the reply comprises at least a portion of the data set, and wherein the request is a read request for the data set.

4. The method of claim 1, wherein the simulating processing the request further comprises:

requesting the other data set from the source device; and storing the other data set in the data store.

5. The method of claim 1, wherein the processing the requester further comprises:

accessing the data set from the data store;

receiving the other data set from the source device; and sending respective portions of the data set and the other data set to the communication device in response to the request.

6. The method of claim 1, wherein the facilitating the establishing of the second communication link comprises intercepting a communication between the source device and the communication device, and wherein the communication from the communication device is identified based on an identifier associated with the source device.

7. The method of claim 1, further comprising:
monitoring write data received from the communication device;
storing the write data in the data store; and
distinguishing the write data from the data set and the other data set,
wherein the distinguishing comprises marking the write data as new data.

8. The method of claim 1, further comprising:
determining that the plurality of data sets have been migrated from the source device to the system; and
terminating the first communication link.

9. The method of claim 1, wherein the facilitating the establishing of the first communication link comprises facilitating establishing a client relationship with the source device that performs a background operation while receiving the at least the data set from the source device.

10. The method of claim 1, wherein the facilitating the establishing of the first communication link comprises communicating with the source device via one or more intermediate network devices.

11. A system, comprising:
a memory that stores computer-executable components; and
a processor, communicatively coupled to the memory, which executes or facilitates execution of one or more of the computer-executable components, the computer-executable components comprising:
a background processing manager configured to establish a link between the system and a host service, wherein the host service is configured to process requests from a device;
a data relocator configured to migrate data from the host service to the memory via the link;
a client processing manager configured to establish a first communication session between the system and the device for replacement of a second communication session between the device and the host service by intercepting communications between the device and the host service, wherein the replacement of the second communication session includes replacement of the second communication session by the first communication session while migration of data from the host service to the memory via the link;
a communicator configured to receive, via the first communication session, a request from the device for a subset of the data; and
a service request processor configured to:
obtain the subset of the data from the memory based on a determination that the subset of the data is present in the memory of the system;
obtain, using an identifier of the device to access the host service, the subset of the data from the host service based on a determination that the subset of the data is absent in the memory of the system, wherein the usage of the identifier of the device facilitates the host service to determine that the request is received from the device,
wherein the communicator is further configured to send the subset of the data to the device in response to the request, wherein the sending is performed by the system using the identifier of the host service;
wherein the data relocator is further configured to migrate the data from the host service to the memory while the service request processor obtains the subset of the data from the memory to facilitate migration of the data from the host service to the memory without interruption of service to the device.

12. The system of claim 11, wherein the data relocator is further configured to determine that the data from the host service has been migrated to the memory, and wherein the background processing manager is further configured to disable the link between the system and the host service.

13. The system of claim 11, wherein the background processing manager is further configured to establish the link between the system and the host service via an intermediate device, and wherein the intermediate device is a communication network device.

14. The system of claim 11, wherein the request is a read request and the service request processor is configured to search the memory for the subset of the data and wherein the communicator is further configured to send the data accessed from the host service to the device.

15. The system of claim 11, wherein the client processing manager is further configured to intercept communications between the host service and the device, and wherein the communications comprise an address associated with the host service.

16. The system of claim 11, wherein the request comprises a write data segment stored in the memory, and the computer-executable components further comprise an overlay protector configured to identify the write data segment as non-rewritable data.

17. The system of claim 11, wherein the link between the system and the host service is a client relationship with the host service, and wherein the host service is configured to perform background operations concurrently with migration of the data by the data relocator from the host service to the memory via the link.

18. The system of claim 11, wherein the service request processor is further configured to replicate a network service that is transparent to the device.

19. A system, comprising:
a memory to store instructions; and
a processor, coupled to the memory, that executes or facilitates execution of the instructions to perform operations, comprise:
create a first communication link between a system and a communication apparatus by intercepting communications between a host device and the communication apparatus,
create a second communication link between the system and the host device, wherein the first communication link and the second communication link replace a direct link between the communication apparatus and the host device;
receive a plurality of data segments from the host device via the second communication link, wherein the replacement of the direct link includes replacement of the direct link by the first communication link while receiving the plurality of data segments from the host device via the second communication link;
store the plurality of data segments received from the host device in a data store;

receive, from the communication apparatus, a service request for a data segment of the plurality of data segments;

determine a location of the data segment, wherein the location of the data segment is based on a location of the host device;

access the data segment at the location;

obtain, by use of an identification of the communication apparatus, the data segment from the host device via the first communication link, wherein the usage of the identification of the communication apparatus facilitates the host device to determine that the service request is received from the communication apparatus; and convey a reply to the service request via the first communication link, wherein the operations to convey the reply includes sending at least a portion of the data segment to the communication apparatus via the first communication link to facilitate receiving, by the system, the plurality of the data segments from the host device without interruption of service to the communication apparatus, wherein the sending is performed by the system using the identifier of the host device.

20. The system of claim 19, wherein the operations further comprise:

use an identification of the host device to communicate with the communication apparatus.

* * * * *

UNITED STATES PATENT AND TRADEMARK OFFICE
CERTIFICATE OF CORRECTION

PATENT NO. : 10,142,424 B2
APPLICATION NO. : 14/408560
DATED : November 27, 2018
INVENTOR(S) : Zhao et al.

Page 1 of 1

It is certified that error appears in the above-identified patent and that said Letters Patent is hereby corrected as shown below:

In the Claims

In Column 26, Line 54, please delete "requester" and insert -- request -- therefor.

In Column 26, Lines 60 and 61, please delete "the simulating processing" and insert -- the processing -- therefor.

In Column 26, Line 65, please delete "requester" and insert -- request -- therefor.

Signed and Sealed this
Fourth Day of February, 2020

Andrei Iancu
*Director of the United States Patent and Trademark Office*